US007266511B2

(12) United States Patent
Teshima

(10) Patent No.: US 7,266,511 B2
(45) Date of Patent: Sep. 4, 2007

(54) METHOD AND SYSTEM FOR OPERATING A VIRTUAL SHOPPING MALL OR SELLER-ENGAGED TYPE

(75) Inventor: Atsushi Teshima, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 846 days.

(21) Appl. No.: 09/742,362

(22) Filed: Dec. 22, 2000

(65) Prior Publication Data

US 2001/0007979 A1 Jul. 12, 2001

(30) Foreign Application Priority Data

Jan. 11, 2000 (JP) ............................... 2000-002997

(51) Int. Cl.
*G06Q 30/00* (2006.01)
(52) U.S. Cl. .......................................... 705/26; 705/27
(58) Field of Classification Search ................. 705/26, 705/27
See application file for complete search history.

(56) References Cited

U.S. PATENT DOCUMENTS

| | | | | |
|---|---|---|---|---|
| 5,240,098 | A | * | 8/1993 | Desai et al. ................. 194/219 |
| 5,717,776 | A | * | 2/1998 | Watanabe .................... 382/116 |
| 5,727,163 | A | * | 3/1998 | Bezos .......................... 705/27 |
| 5,869,819 | A | * | 2/1999 | Knowles et al. ............. 235/375 |
| 5,895,454 | A | * | 4/1999 | Harrington ................... 705/26 |
| 5,933,814 | A | * | 8/1999 | Rosenberg ................... 705/26 |
| 5,946,665 | A | * | 8/1999 | Suzuki et al. ................ 705/26 |
| 5,970,471 | A | * | 10/1999 | Hill .............................. 705/26 |
| 5,983,003 | A | * | 11/1999 | Lection et al. .............. 709/202 |
| 6,026,376 | A | * | 2/2000 | Kenney ........................ 705/27 |
| 6,058,417 | A | * | 5/2000 | Hess et al. ................... 709/219 |
| 6,125,353 | A | * | 9/2000 | Yagasaki ....................... 705/27 |
| 6,170,017 | B1 | * | 1/2001 | Dias et al. .................. 709/235 |
| 6,202,051 | B1 | * | 3/2001 | Woolston ...................... 705/27 |

(Continued)

FOREIGN PATENT DOCUMENTS

EP 0950970 A2 * 10/1999

OTHER PUBLICATIONS

Anon., "Electronic In-Home Shopping: Our Stores Are Always Open," (Abstract only), Chanin Store Age Executive Edition, Mar. 1985, p. 11,1161.*

(Continued)

*Primary Examiner*—Nicholas D. Rosen
(74) *Attorney, Agent, or Firm*—McGinn IP Law Group, PLLC

(57) ABSTRACT

A virtual shopping mall system of seller-engaged type is provided. A virtual shopping mall operations apparatus E accepts virtual goods information corresponding to real goods from a seller A and registers the virtual goods information to the virtual shopping mall. The virtual shopping mall operations apparatus E presents the virtual goods information to a buyer B and intermediates a trade between the seller A and the buyer B on the virtual shopping mall. When a trade is reached, the virtual shopping mall operations apparatus E achieves the trade on the virtual shopping mall by setting a delivery path for real goods from the seller A to the buyer B. In order to set a delivery path, a terminal base D, which is selected from a plurality of chained real terminal bases, is set up for a buyer B to receive real goods.

17 Claims, 43 Drawing Sheets

U.S. PATENT DOCUMENTS

| | | | |
|---|---|---|---|
| 6,260,024 B1* | 7/2001 | Shkedy | 705/37 |
| 6,381,510 B1* | 4/2002 | Amidhozour et al. | 700/130 |
| 6,522,738 B1* | 2/2003 | Cruickshank et al. | 379/201.03 |
| 6,754,636 B1* | 6/2004 | Walker et al. | 705/26 |
| 6,760,711 B1* | 7/2004 | Gillett et al. | 705/64 |
| 6,785,660 B1* | 8/2004 | Fedor et al. | 705/37 |
| 6,812,962 B1* | 11/2004 | Fredlund et al. | 348/231.2 |
| 2001/0056377 A1* | 12/2001 | Kondoh et al. | 705/26 |
| 2002/0002513 A1* | 1/2002 | Chiasson | 705/27 |
| 2003/0093355 A1* | 5/2003 | Issa | 705/37 |

OTHER PUBLICATIONS

Anon., "COMPUSERVE: CompuServe Adds Powerful Graphics Tools in Alliance with Pegasus Imaging Corporation," M2 Presswire, Apr. 9, 1996.*

Anon., "WEBMATE: WebMate Announces MallMaker and StoreMaker, Revolutionary Internet Software Products for Electronic Commerce," Business Wire, Sep. 3, 1996.*

Scisco, P., "Tend the Store for World Wide Orders," Computer Life, vol. 4, No. 9, p. 142, Sep. 1997.*

Anon., "MICROSOFT: The Microsoft Plaza Brings Product Returns Convneience to Online Shoppers," Business Wire, Dec. 1, 1997.*

Galler, B.A., "IP:NYT Digital Commerce: Is Delivery the Dealbreaker for E-Commerce?," umich.interesting.people, Mar. 30, 1998.*

Anon., "Packagenet Develops Network" (Abstract only), DM News, vol. 20, No. 14, p. 3, Apr. 13, 1998.*

Anon., "Netcentives and the Microsoft Plaza Enter into Agreement to Drive Electronic Commerce," PR Newsire, May 26, 1998.*

Anon., "iMall's Stuff.com to Offer Most Comprehansive Product-Based Shopping Search Engine on the Internet," Business Wir Oct. 29, 1998.*

Mires, C., "On-Line Shopping Is Open Anytime," Phiadelphia Inquirer, final edition, p. E01, Thursday, Dec. 15, 1998.*

Anon., "Electronic Trasnfer Associates Inc. Announces Details of Worldwide MArketing Agreement with Citron Inc.," Busin ss Wire, Jan. 14, 1999.*

Anon., "Keycorp Open Net Portal to Boost Small Businesses," Plain Dealer, p. 1-C, Oct. 6, 1999.*

Anon., pages from the www.PackageNet.com website as of Nov. 29, 1999.*

Anon., "Tools of the Trade," PC Week, vol. 6, No. 46, p. 116, Nov. 20, 1989.*

Keifer, M., "Service Vendor Alliance Will Simplify Sourcing and Service of Enterprise-Wide Computer Systems," PR NEwswire, Oct. 27, 1993.*

Taj, S., "ISN Takes Chinese Home Shopping a Step Forward," Response TV, p. 58, Sep. 1996.*

Aslett, M., "Please Re-Lease Me," Unix & NT News, p. 23, Sep. 1998.*

Jones, K., "Pumping up $ales on the Internet," Electrical Apparatus, vol. 51, No. 10, pp. 21-24, Oct. 1998.*

Wood, W.T., "Steel Termed Essential Aircraft Component," American Metal Market, vol. 107, No. 75, p. 7A, Apr. 20, 1999.*

Anon., "Standard & Poor's Approves First Capital International, Inc. for Listing," PR Newswire, May 17, 1999.*

Hickey, K., "Going Once, Going Twice," Traffic World, vol. 258, No. 13, p. 44, Jun. 28, 1999.*

Turner, J., "Stake out Your Own Little Corner of the Web," Christian Science Monitor, p. 16, Nov. 22, 1999.*

McConnell, J.P., "Restaurant No-Shows: Can you Take Them to Court?" (Abstract only), Cornell Hotel and Restaurant Administrative Quarterly, vol. 30, No. 4, pp. 66-67, Feb. 1990.*

Anon., "eBay Launches the Most Comprehensive Trust and Safety Upgrades to the World's Largest Person-to-Person Trading Site," eBay, PR Newswire Assocaition, Jan. 15, 1999.*

Anon., "eBay Responds to Human Kidney Listings," eBay, PR Newswire Assocaition, Sep. 3, 1999.*

Mullins, A., "Illegal Kidney Auction on Net Halted after Bids Reach Pounds 3.6m," Independent, Foreign edition, News section, p. 3, Sep. 4, 1999.*

Anon., "CNN Looking to Partner with Drug Store for Online Mall," Drug Store News, vol. 21, No. 8, CP36, May 17, 1999.*

Anon., "Staples, Inc., Licenses NetResults ProShop for Business-to-Business E-Commerce," PR Newswire, Oct. 20, 1998.*

Wexler, D., "Screen Busters; Keyboard Troubles? Who Ya Gonna Call? Touchpen and Touch Screen Information Display Offer You an Alternative: You Simply Touch the Screento Input Your Responses," PC Magazine, vol. 4, p. 237, Jan. 8, 1985.*

* cited by examiner

22

| INDEX | FAMILY NAME | FIRST NAME | NAME OF SHOP | TEL | ADDRESS |
|---|---|---|---|---|---|
| MAIN KEY | CHARACTER | CHARACTER | CHARACTER | CHARACTER | CHARACTER |
| 1 | PETERSON | JOHN | EXO | 310-234-5678 | SAN JOSE, CALIFORNIA... |
| 2 | WEIGN | PAUL | OZ | 480-232-1331 | MORGAN HILL, CALIFORNIA... |
| ... | | | | | ... |

| E-MAIL ADDRESS | REGISTERED SHOP INDEX | REGISTERED DATE | ID | PASSWORD | NUMBER OF SHELVES |
|---|---|---|---|---|---|
| CHARACTER | ID | DATE | CHARACTER | CHARACTER | NUMBER |
| exo@aaa.bbb | 24 | 9/4/1999 | H&4krP3 | 3hsT%kR | 5 |
| oz@ccc.ddd | 11 | 9/7/1999 | JPs(h=rH | 4H;sqZs# | 5 |
| ... | | | | | ... |

| INDEX | OWNER INDEX ID | CATEGORY | NAME OF GOODS | PRICE | COMMENTS |
|---|---|---|---|---|---|
| MAIN KEY | | CHARACTER | CHARACTER | NUMBER | CHARACTER |
| 1 | 2 | CLOCK | GRANDPA'S OLD CLOCK | $50 | STILL MOVING… |
| 2 | 1 | CLOTHES | COWBOY HAT | $20 | REAL AMERICAN… |
| … | … | … | … | … | … |

| SUM TOTAL OF ITEMS SOLD | STATUS OF NAME DISCLOSURE | STATUS OF SALE | REGISTERED DATE |
|---|---|---|---|
| NUMBER | BOOLEAN VALUE | BOOLEAN VALUE | DATE |
| 0 | N | Y | 9/29/1999 |
| 0 | Y | Y | 10/22/1999 |
| … | … | … | … |

| INDEX | NAME OF SHOP | TEL | ADDRESS | FAX | E-MAIL ADDRESS | SHOP CODE | REGISTERED DATE |
|---|---|---|---|---|---|---|---|
| MAIN KEY | CHARACTER | CHARACTER | CHARACTER | CHARACTER | CHARACTER | CHARACTER | DATE |
| ... | ... | ... | ... | ... | ... | ... | ... |
| 24 | NY | 03-1111-2222 | POTSDAM, NEW YORK | 310-111-2223 | SESB@abc.xyz | SESB01 | 1/19/1999 |
| ... | ... | ... | ... | ... | ... | ... | ... |

28

| INDEX | TRADE ID | GOODS INDEX | RECEIVER SHOP INDEX | TEL NO. OF PURCHASER | E-MAIL ADDRESS OF PURCHASER | REGISTERED DATE | PROGRESS |
|---|---|---|---|---|---|---|---|
| MAIN KEY | CHARACTER | ID | ID | CHARACTER | CHARACTER | DATE | NUMBER |
| ... | ... | ... | ... | ... | ... | ... | ... |
| 4142 | 5102634 | 2 | 11 | 480-444-7777 | weigh@aaa.bbb | 12/9/1999 | 4 |
| ... | ... | ... | ... | ... | ... | ... | ... |

*FIG. 8*

BASIC FEES

| CATEGORY OF SHOP | SHELVES | INITIAL FEE | MONTHLY FEE |
|---|---|---|---|
| Shop-S | 5 | $10 | — |
| Shop-M | 10~100 | $100 | $1 × NUMBER OF SHELVES |
| Shop-L | 20~1000 | $500 | $2 × NUMBER OF SHELVES |

FEES FOR EACH TRADE

| AMOUNT TRADED | FEE |
|---|---|
| ~$10 | $1 |
| $10~$50 | $1.50 |
| $50~$300 | $2.50 |
| #300~$2,000 | $5 |
| $2,000~ | $10 |

FIG. 9

GOODS REGISTRATION

SHOP: EXO    ITEMS REGISTERED: 3
VACANT SHELVES: 2

| NEW REGISTRATION | CHANGE |
| CONFIRMATION | DELETE |
| USER'S GUIDE | END |

*FIG. 34*

NEW REGISTRATION

PLEASE FILL IN THE BLANK SPACES BELOW.

CATEGORY
NAME OF GOODS
PRICE
COMMENT

CHANGE

DISCLOSURE OF SHOP NAME ●YES  ○NO

OK    CANCEL

*FIG. 35*

GOODS SEARCH

FILL IN THE BLANK SPACES AND DESIGNATE CONDITIONS.

NAME OF GOODS [        ]   NAME OF SHOP [    ]

PRICE [        ] ~ [        ]

KEYWORD [        ] AND [        ] OR

[        ] AND [        ] INCLUDE

CATEGORY

◉ NO CATEGORY ○ SHOP ○ CATEGORY ○ SALE DATE ○ PRICE

[ OK ]  [ CANCEL ]

*FIG. 52*

GOODS SEARCH

FILL IN THE BLANK SPACES AND DESIGNATE CONDITIONS.

NAME OF GOODS [        ]   NAME OF SHOP [    ]

PRICE [        ] ~ [ 5000 ]

KEYWORD [ INTERIOR GOODS ] AND [        ] OR

[ CLOTHES ] AND [        ] INCLUDE

CATEGORY

◉ NO CATEGORY ○ SHOP ○ CATEGORY ○ SALE DATE ○ PRICE

[ OK ]  [ CANCEL ]

*FIG. 53*

PURCHASE OF GOODS

FILL IN THE BLANK SPACES.

E-MAIL ADDRESS [ ]

TEL [ ]

[ RECEIVE AT THIS SHOP ]   [ RECEIVE AT ANOTHER SHOP ]

[ CANCEL ]

*FIG. 56*

PURCHASE OF GOODS

FILL IN THE BLANK SPACES.

E-MAIL ADDRESS [weign@aaa.bbb]

TEL [480-444-7777]

[ RECEIVE AT THIS SHOP ]   [ RECEIVE AT ANOTHER SHOP ]

[ CANCEL ]

*FIG. 57*

```
                    SHOP SELECTION

SELECT A SHOP FOR RECEIVING GOODS.

● BONITA           ● SAN DIEGO      ● LA JOLLA
    ● CHULA VISTA      ● CLAIREMONT     ● MIRAMAR
    ● NATIONAL CITY    ● MEL MAR        ● LINDA VISTA

[ BACK ]
```

| TYPE | 10~ | 50~100 | 100~500 | 500~2000 | 2000~ |
|---|---|---|---|---|---|
| TYPE A | 95% | 90% | 85% | 80% | 75% |
| TYPE B | 90% | 90% | 90% | 90% | 90% |
| TYPE C | 100% | 100% | 80% | 80% | 80% |

FIG. 64

METHOD AND SYSTEM FOR OPERATING A VIRTUAL SHOPPING MALL OR SELLER-ENGAGED TYPE

This patent application claims priority from a Japanese patent application No. 2000-002997 filed on Jan. 11, 2000, the contents of which are incorporated herein by reference.

BACKGROUND OF THE INVENTION

1. Field of the Invention

The present invention relates to a method and system for operating a virtual shopping mall using a computer system. In particular, the present invention relates to a method and system for a virtual shopping mall of a seller-engaged type.

2. Description of the Related Art

With the spread of the Internet as a background, business relating to electronic commerce has been a focus of constant attention. A mail order business on the Internet is an example of electric commerce business.

A mail order business is conducted in the following way, for example. First, a seller obtains a space for a Web site from an Internet provider. The seller makes a Web site of his/her shop by himself/herself. The seller then operates his/her virtual shop by himself/herself. A buyer visits the seller's Web site and applies to purchase an item. If a sales contract is established between the seller and the buyer, the seller sends the item to the buyer.

A virtual shopping mall system of this type is very convenient for buyers. Buyers can purchase items easily without visiting actual shops. Buyers only need to have means, such as the Internet, for visiting Web sites.

Moreover, the virtual shopping mall system has an advantage for sellers in that sellers can have their own shops with only a small investment. However, there are some troubles for sellers to actually open a Web site.

For example, a seller has to create a Web site by himself/herself on a computer to open a virtual shop. This operation requires a great deal of time and effort and a seller has to have an excellent command of computers. A seller can use a service for creating a Web site, but such a service can cost the seller more.

Further, a seller basically has to communicate with buyers through a network by himself/herself. Such communication can be an annoyance to a seller.

Furthermore, there are some sellers who do not want to submit their names as a seller. However, it is difficult to conceal a seller name while securing credibility of a sellers business, according to the conventional art.

Conventionally, a seller generally has to open and maintain his/her own virtual shop by himself/herself as described above. This process can be a workload for sellers. It can especially be a great burden for individual and small business sellers. Therefore, the number of those sellers who can manage a virtual shop is actually very limited.

On the other hand, buyers, such as individual and small business buyers, can use a virtual shopping mall system easily. The reason is that all buyers simply have to participate in a virtual shopping mall system and go shopping. If sellers simply participate in a virtual shopping mall system, the burden on sellers would be greatly reduced. Thus, an individual can easily be a seller using the virtual shopping mall system.

The problems regarding the conventional art are discussed here with respect, as one example, to the virtual shopping mall system that uses a Web site on the Internet. However, any similar virtual system may cause these common problems.

SUMMARY OF THE INVENTION

Therefore, it is an object of the present invention to provide a method and system for a virtual shopping mall of a seller-engaged type, which is capable of overcoming the above drawbacks accompanying the conventional art. The above and other objects can be achieved by combinations described in the independent claims. The dependent claims define further advantageous and exemplary combinations of the present invention.

In order to achieve the object described above, an aspect of the present invention is a method for operating a virtual shopping mall by using a computer system. This method includes registering virtual goods information, which corresponds to a seller's real goods, to the virtual shopping mall after receiving the virtual goods information from the seller; intermediating business between a seller and a buyer on the virtual shopping mall by presenting the virtual goods information to a buyer; setting a delivery path for the real goods from the seller to the buyer by the buyer's selection of a terminal base to receive the real goods from a plurality of real terminal bases; and trading, which achieves business on the virtual shopping mall.

The registering virtual goods information may include capturing an image of the real goods as a part of the virtual goods information; and the intermediating business intermediates the business by presenting the image to the buyer.

The method for operating a virtual shopping mall may further include: presenting each of the images, which are included in the virtual goods information of a plurality of registered real goods, to the seller when the seller requests to modify the virtual goods information; and making the seller select which of the virtual goods information about real goods among a plurality of the real goods presented by the presenting to modify.

The presenting may dispose each of the images by demagnifying the images and presents to the seller.

The trading may include the seller's setting a terminal base at the plurality of real terminal bases to bring in the real goods.

The method for operating a virtual shopping mall may further include instructing a physical distribution system, which includes the plurality of real terminal bases, to deliver the real goods.

The intermediating business may present the virtual goods information to the buyer as securing anonymity of the seller.

The method for operating a virtual shopping mall may further include setting the maximum value of the number of categories of the virtual goods, which can be displayed on the virtual shopping mall, according to the fee charged from the seller.

The method for operating a virtual shopping mall may further include; updating the seller's database when the trade is established, and the computer system may store the amount of past trades for each of the sellers in the seller's database and setting the fee for the virtual shopping mall lower for those sellers whose amount of past trades stored in the seller's database is large.

The method for operating a virtual shopping mall may further include inspecting goods to see whether or not the virtual goods information requested for registration by the seller is appropriate.

The method for operating a virtual shopping mall may further include giving a penalty based on a predetermined penalty rule on the virtual shopping mall against the seller who requests to register inappropriate virtual goods information.

The predetermined penalty rule may be established to give different penalties against the seller according to the number of registrations of the inappropriate virtual goods information.

The method for operating a virtual shopping mall may further include forming a black list, which shows a buyer who does not arrive to receive the real goods despite that a trade on the virtual shopping mall has been established.

Another aspect of the present invention is a virtual shopping mall system, which is established by using a computer system. This method includes: a commercial goods managing database, which is provided to each seller and registers virtual goods information corresponding to real goods of the seller; and a function of delivery setting, which achieves a trade on the virtual shopping mall by setting a delivery path for the real goods, from the seller to a buyer, when a trade between the buyer, who is presented with the virtual goods information in the commercial goods managing database, and the seller has been established.

The virtual shopping mall system may further include a terminal base unit, which is installed at each of a plurality of real terminal bases that forms a physical distribution system and is connected to communicate with a virtual shopping mall operations apparatus that manages the commercial goods managing database.

The virtual shopping mall system may further include: a shop managing database, which sets up a virtual shop for selling the goods for each of the sellers on the computer system; and processing an owner registration procedure for sellers who want to open the virtual shop and be an owner.

The terminal base may function as a place for a seller to bring real goods and for a buyer to receive the real goods, through communication information with the virtual shopping mall operations apparatus.

The virtual shopping mall system may further include generating virtual goods information, which generates virtual goods information that corresponds to real goods or a seller who is an owner of a virtual shop.

The generating virtual goods information may include a media equipment device, which reads image data of real goods from a recording medium.

The generating virtual goods information may include an image capturing unit, which captures an image of real goods that are brought to the terminal base by the seller.

The generating virtual goods information may include a picture reading unit, which obtains image data of the real goods from a picture of the real goods brought in to the terminal base by the seller.

The virtual shopping mall system may further include a management function, which manages information about leasing to a seller, or an owner of a virtual shop, an image capturing unit, which can be used for generating virtual goods information that corresponds to real goods.

The virtual shopping mall system may further include a catalog printing apparatus, which prints out a catalog of virtual goods information.

The virtual shopping mall system may further includes a search function, which searches virtual goods information of which a virtual shopping mall operations apparatus manages.

Another aspect of the present invention is a recording medium, which stores a program that can be read by a computer The program is a program to operate a virtual shopping mall, which includes; registering virtual goods information corresponding to real goods of a seller to the virtual shopping mall by receiving the virtual goods information from the seller; intermediating business between a seller and a buyer on the virtual shopping mall by presenting the virtual goods information to the buyer; and achieving a trade on the virtual shopping mall by setting a delivery path of the real goods from the seller to the buyer.

The summary of the invention does not necessarily describe all necessary features of the invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 5 is a view showing an owner managing database.

FIG. 6 is a view showing a commercial goods managing database.

FIG. 7 is a view showing a shop managing database.

FIG. 8 is a view showing a business managing database.

FIG. 9 is an exemplary table of the fee system of the virtual shopping mall system.

FIG. 34 is the screen page of the home site for registering a sales item which is displayed on the screen of the terminal base unit.

FIG. 35 is the screen page for entering a new registration of a sales item, which is displayed on the screen of the terminal base unit.

FIG. 52 is the screen page of the home site for searching an item, which is displayed on the screen of the terminal base unit.

FIG. 53 is the completed screen page for searching an item, which is displayed on the screen of the terminal base unit.

FIG. 56 is the screen page for purchasing the selected item, which is displayed on the screen of the terminal base unit.

FIG. 57 is the completed screen page for purchasing the selected item, which is displayed on the screen of the terminal base unit.

FIG. 64 is an exemplary discount setting table for optional use.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
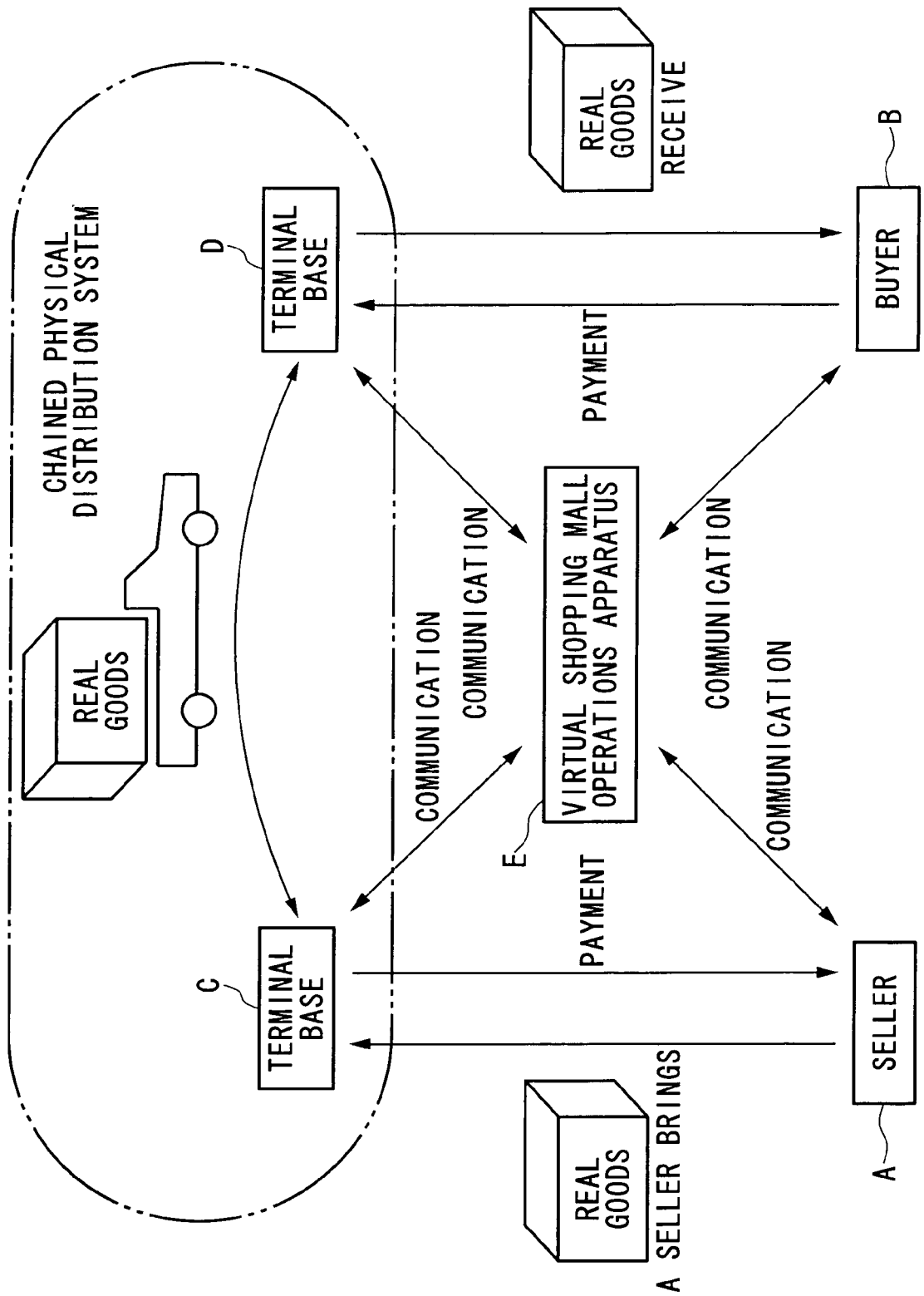
FIG. 1 is a schematic diagram showing an entire system of the present embodiment.

FIG. 1 shows an overview of the present embodiment. A virtual shopping mall system includes a virtual shopping mall operations apparatus E, which functions as a server. The virtual shopping mall operations apparatus E connects to a seller A and a buyer B through communication. The means of communication is the Internet in the present embodiment, for example, but any other means may be applicable.

The virtual shopping mall system is connected to a plurality of terminal base units installed at a plurality of terminal bases, as described later, for communication. The means for communication is an intranet, for example, but the means can be flexible. FIG. 1 shows two terminal bases C and D, but a lot more terminal bases are supposed.

A plurality of terminal bases are chained to one another and form a physical distribution system. A plurality of terminal bases are preferably chain stores such as convenience stores, photo shops, restaurants, and train stations, for example. In this case, the virtual shopping mall operations apparatus E may be installed at the headquarters of the convenience store. The chain stores may also be photo shops relating to the filing applicant of the present invention. However, it is obvious that the terminal base and the physical distribution system are not limited to these examples described above.

In FIG. 1, the virtual shopping mall operations apparatus E manages and operates virtual shops on a computer system. The virtual shopping mall operations apparatus E receives information of virtual commercial goods corresponding to real commercial goods of the seller A. The virtual shopping mall operations apparatus registers the received information. The virtual shopping mall operations apparatus then presents the registered information of the virtual commercial goods to the buyer B.

Figure 2:
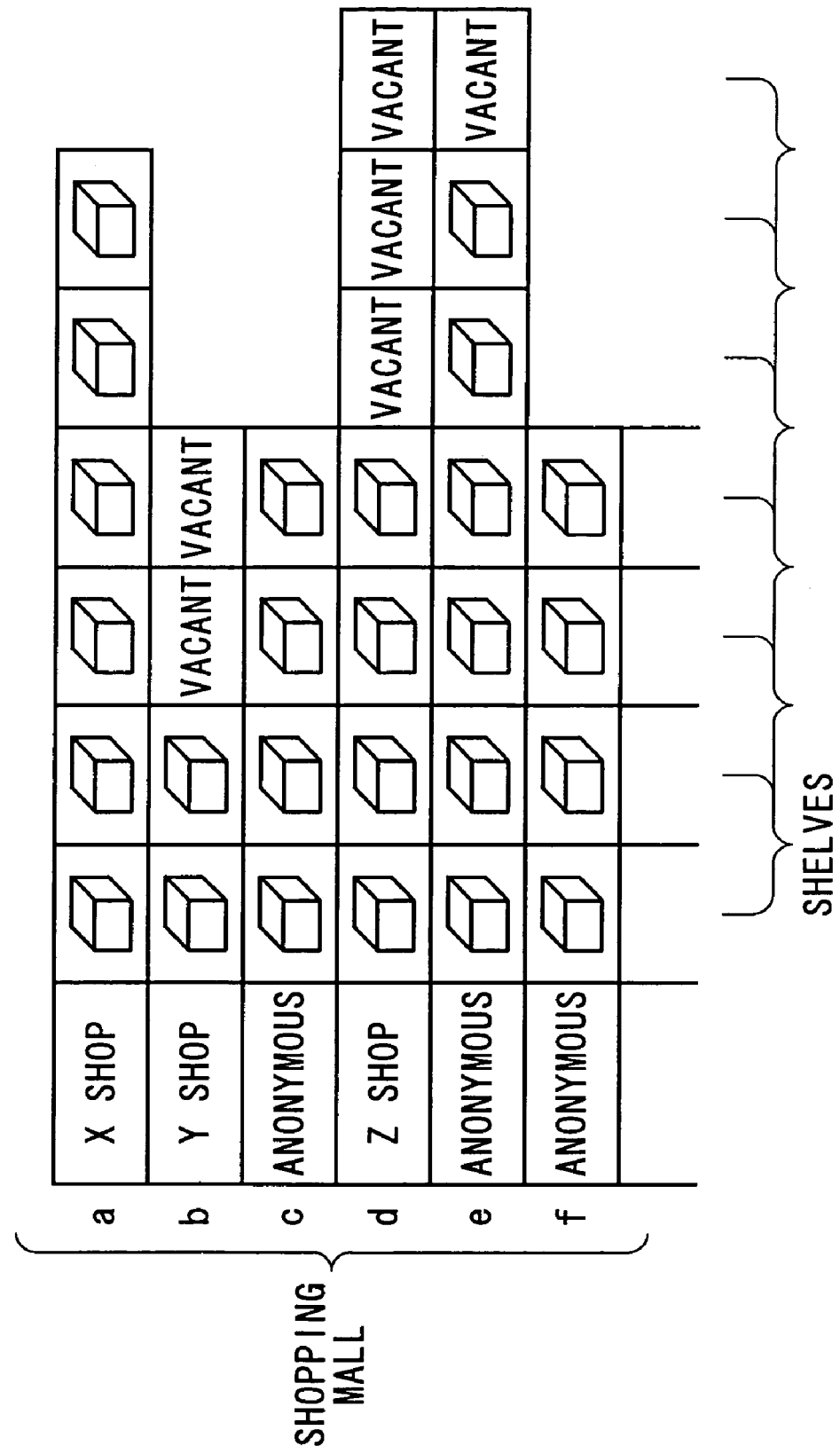
FIG. 2 is a view showing an image of a virtual shopping mall.

FIG. 2 shows an image of a virtual shopping mall. Virtual shops are set for a plurality of sellers a, b, c, and so on. Commercial goods of sellers are registered in each virtual shop.

As shown in FIG. 2, a seller may either disclose the name of his/her shop like sellers a, b and d, or not disclose his/her shop like sellers c, e and f.

Further, the size of the space for a virtual shop differs depending on sellers, as described in FIG. 2. The size of the space for a virtual shop is shown by the number of shelves that can display commercial goods, according to the present embodiment. The spaces for the virtual shops, or the shelves for commercial goods, are basically certain domains on a memory device of the virtual shopping mall operations apparatus E. The number of shelves is set according to the fee that a seller pays, which will be described later.

Furthermore, FIG. 2 shows how each of a plurality of the virtual shops forms a shopping mall. In contrast, one virtual shop may provide shop spaces to a plurality of sellers such as a department store. The whole shopping mall may also be one virtual shop. On the other hand, each space in a department store may be one virtual shop. After all, the unit of a virtual shop can be set freely.

Referring to FIG. 1, the virtual shopping mall operations apparatus E presents virtual shop goods information to a buyer B. The virtual shopping mall operations apparatus E then intermediates a trade on a virtual shop between a seller A and the buyer B. If the trade is reached, at delivery path of real goods from the seller A to the buyer B is set. The real goods are delivered through this delivery path. The business on the virtual shops are conducted in this way.

According to the present invention, a buyer B is arranged to receive goods from a terminal base D, as a delivery path. The terminal base D is arranged according to the selection of a buyer B. The buyer B selects the nearest terminal base, for example. If the place where the purchased item is received is predetermined, the place is arranged as a selected terminal base for receiving the purchased item.

Therefore, the goods delivery path is arranged so that a purchase item is delivered from the seller A to the designated terminal base D through a physical distribution system, by passing through any one of the terminal bases, and to a buyer B.

Commercial goods are delivered from a seller A to a buyer B according to the arrangement described above. The seller A brings real commercial goods to a pre-selected terminal base C. The terminal C is, for example, the nearest and most appropriate terminal base. The virtual shopping mall operations apparatus E instructs the physical distribution system to deliver the real goods from the terminal C to a terminal D. The physical distribution system delivers the real goods according to the instructions. The buyer B receives the real goods at the terminal D. The buyer B then takes the real goods home.

The terminal base C, where a seller A brings an item to sell, may also be arranged at the trade step on a virtual shopping mall, as well as a terminal D. In this way, the path for two bases of the physical distribution system to pass through are arranged. The terminal C may be arranged according to the selection of the seller A. Since the address of the seller A is registered, the nearest terminal base from this address may be proposed to the seller A as a place for bringing in commercial goods. A place for bringing in real commercial goods may also be previously registered for the seller A. In this case, the registered place for bringing in goods may be arranged as a part of the delivery path. If a place for bringing in goods is pre-arranged, the management of delivering goods becomes easier.

As described above, a method and system for operating a virtual shopping mall of a seller-engaged type can be provided, according to the present invention. A seller participates in the virtual shopping mall system by using electronic communication rather than establishing and managing the virtual shop by himself/herself.

The concept of the virtual shopping mall system according to the present invention in FIG. 1 will be detailed in the following.

Figure 3:
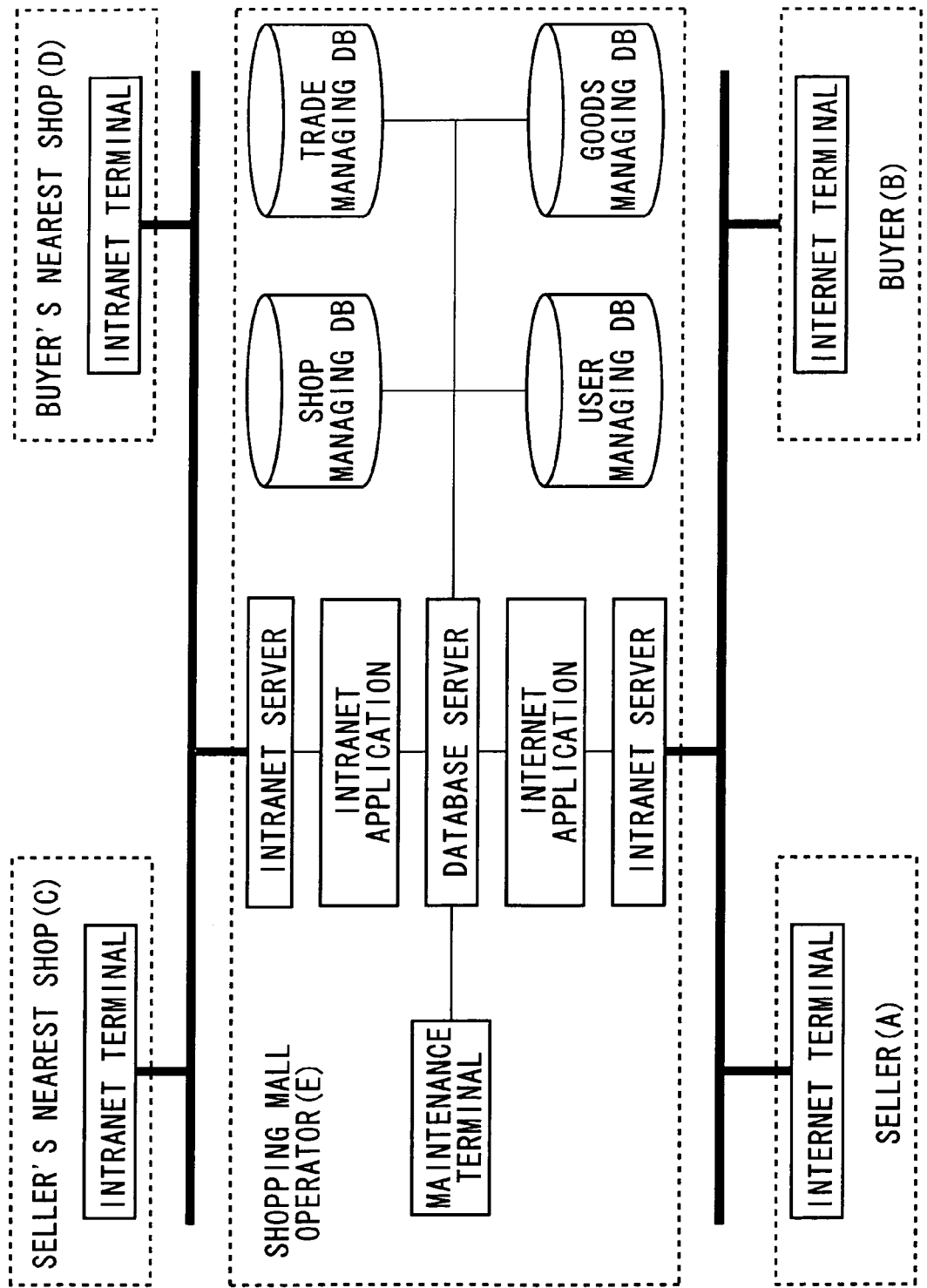
FIG. 3 is a schematic diagram showing the structure of the virtual shopping mall system.

FIG. 3 is a block diagram showing the virtual shopping mall system. A shopping mall operator (E) is one form of the virtual shopping mall operations apparatus E in FIG. 1. A terminal base and its terminal base unit is a shop and an intranet terminal, respectively. The nearest shop (c) of the seller A and the nearest shop (D) of a seller B are shown in FIG. 3 as representatives of many shops.

The seller (A) and the buyer (B) have respective Internet terminals. The Internet terminal is a personal computer at home, for example. An Internet terminal can be any apparatuses that can access the Internet such as a Personal Digital Assistance or PDA and a cellular phone, for example.

The shopping mall operator (E) exists, for example, in the headquarters of a chain store. The shopping mall operator (E) includes an intranet server and an intranet application for communicating with shops. The shopping mall operator (E) also includes an Internet server and an Internet application for communicating with a seller (A) and a buyer (B). The shopping mall operator (E) further includes a database server. The database server manages and operates virtual shops practically as well as controlling the whole operator. The shopping mall operator (E) has a shop managing database, a trade managing database, a user managing database, and goods managing database, for operating virtual shops. The operator of the shopping mall operator operates a maintenance terminal.

The seller (A) may gain access to the shopping mall operator (B) by using an intranet terminal of a chain store, instead of using his/her own Internet terminal. The buyer (B) may also gain access to the shopping mall operator (E) by using an intranet terminal of a chain store, instead of using his/her own Internet terminal. The intranet terminal has the necessary functions for the seller (A) and the buyer (B).

Figure 4:
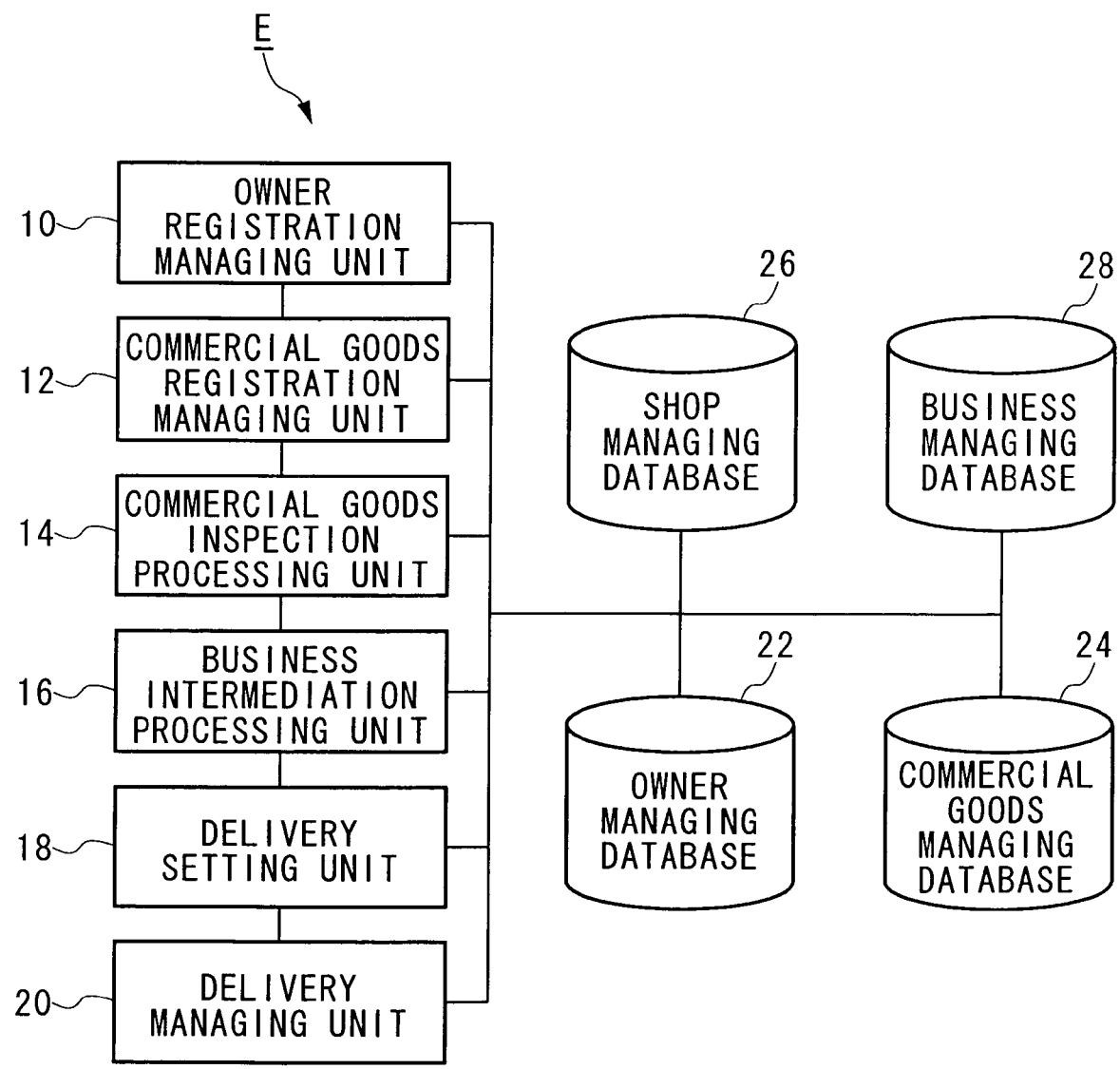
FIG. 4 is a schematic diagram showing the structure of a virtual shopping mall operations apparatus.

FIG. 4 is a block diagram showing the detailed structure of the virtual shopping mall operations apparatus E or the shopping mall operator in FIG. 3. The means of communication between shops and the seller and buyer is omitted.

An owner registration managing unit 10 registers a seller as an owner of a virtual shop and manages the owner. The owner managing database 22 stores owner management information.

A commercial goods registration managing unit 12 receives virtual goods information from a seller that corresponds to real goods of the seller. The commercial goods registration managing unit 12 then registers the received virtual goods information to a virtual shop and manages the registered information. A commercial goods managing database 24 stores virtual goods information.

A commercial goods inspection processing unit 14 checks virtual goods information and judges whether or not registering the virtual goods information to a virtual shop is appropriate. The inspection may be both before and after the registration. If the inspection process is undertaken after registration, the registered item may be deleted or the presentation of the item may be limited, according to the judging results.

A business intermediation processing unit 16 intermediates businesses on virtual shops between sellers and buyers. The business intermediation processing unit 16 undertakes processes, such as presenting items for sale, receiving orders, confirming the stock, and issuing business IDs. The details will be described later. If a trade between a seller and a buyer is reached, a delivery setting unit 18 sets a delivery path for delivering commercial goods. A delivery managing unit 20 then manages the delivering of real commercial goods through the delivery path, A shop managing database 26 and a business managing database 28 are used in the processes from the business intermediation to the delivery management.

FIGS. 5, 6, 7, and 8 exemplifies the owner managing database 22, the commercial goods managing database 24, the shop managing database 26, and business managing database 28, respectively.

The owner managing database 22 stores owner management information such as identification information and addresses. The commercial goods managing database 24 stores various commercial goods information registered by sellers. The commercial goods managing database 24 also stores image data of commercial goods. The shop managing database 26 stores information, such as addresses of each shop. The business managing database 28 stores the contents and statuses of each trade.

The owner managing database 22 and the commercial goods managing database 24 decide a seller and his/her item for sale and form a virtual shop as shown in FIG. 2. The "NUMBER OF SHELVES" in the owner managing database 22 shows the space for a shop as previously described. The number of shelves is set according to the fee that an owner pays.

FIG. 9 is an exemplary table of the fee system for the virtual shopping mall system. The basic fees for a virtual shop are classified into three levels of S, M, and L, according to the number of shelves that a seller uses. Fees for each trade are arranged according to the amount of money traded.

A number showing the progress of trade of the business managing database 28 in FIG. 8, is set, for example, based on the following rule. 1: generation of a trade, 2: stock confirmed, 3: commercial goods have been sent from the seller's nearest shop, 4: arrival of the commercial goods at the buyer's nearest shop, 5: the buyer has received the commercial goods, —1: suspension of the process by a problem, and —2: cancellation of trade.

Terminal base units installed at terminal bases or the intranet terminal in FIG. 3 will be described in the following.

Figure 10:
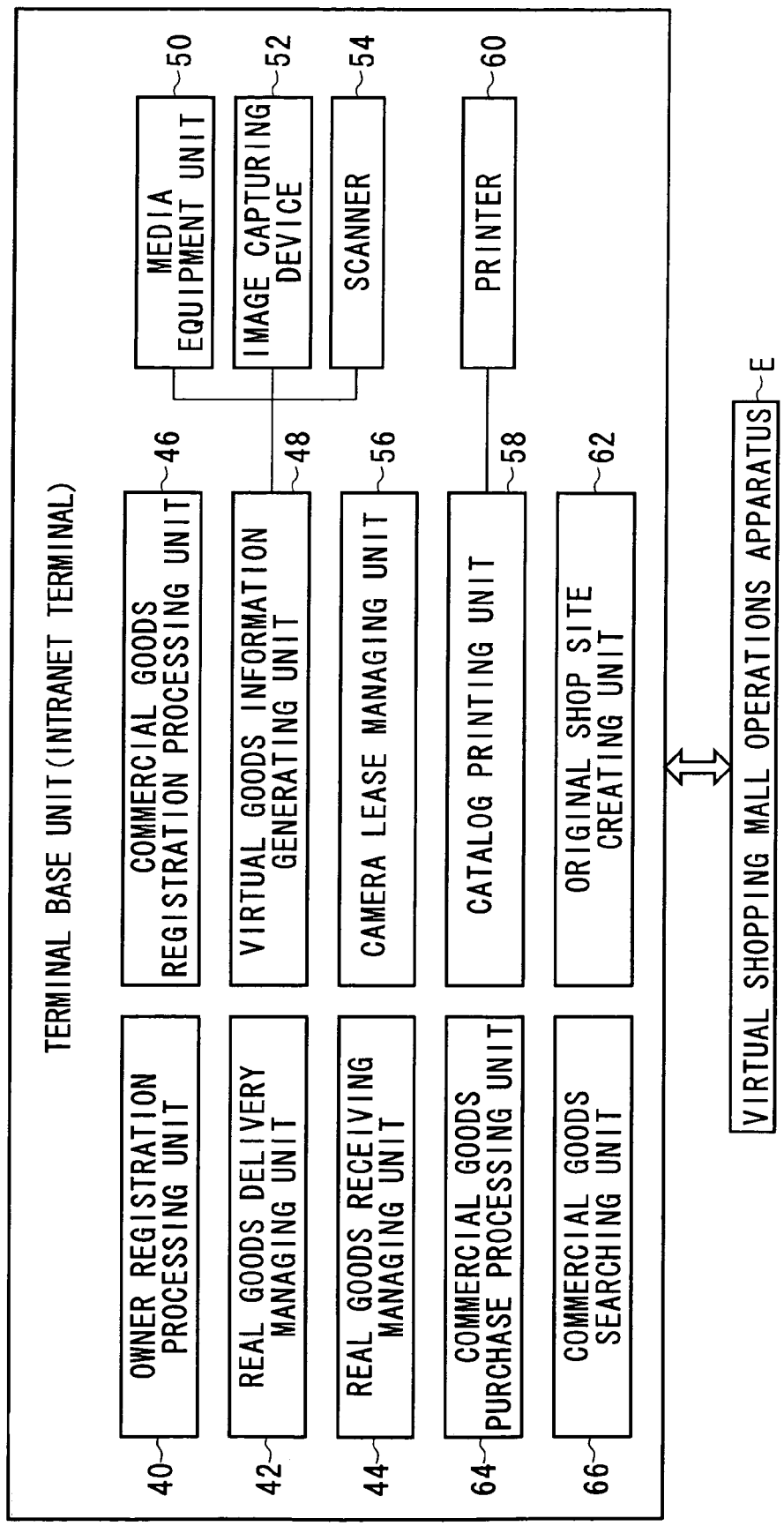
FIG. 10 is a schematic diagram showing the structure of a terminal base unit.

FIG. 10 shows the structure of the terminal base unit. Basic functions of the terminal base unit are the registration of owners and management of bringing and receiving goods. Further, according to the present invention, the terminal base unit includes a function relating to a seller's, registration of goods and a function relating to a buyer's purchase of goods. These functions make it possible for sellers and buyers to use a terminal base unit instead of their own terminal.

In FIG. 10, an owner registration processing unit 40, as well as the virtual shopping mall operations apparatus E, undertakes the process of owner registration for sellers who want to be an owner of a virtual shop. In this way, a seller basically registers an ownership by directly visiting a shop where a terminal base unit is installed. A seller may undertakes the process of owner registration by using his/her own terminal, as another example of the present embodiment.

A real goods delivery managing unit 42 functions when a seller brings an item for sale to a terminal base. The seller brings to a terminal base an item for sale as well as a trade ID, such as identification information, numbers, letters, signs, and combinations of this information. The real goods delivery managing unit 42 sends a trade ID to the virtual shopping mall operations apparatus E and inquires about the destination of the shipping goods. The virtual shopping mall operations apparatus E replies with the destination terminal base of the shipping goods. The real goods delivery managing unit 42 sends the shipping goods to the specified destination. The real goods delivery managing unit 42 then notifies the end of shipment to the virtual shopping mall operations apparatus E.

If a terminal base is previously designated as a place for bringing an item for sale before a seller brings the item, a trade ID and a destination of shipping are preferably notified to the terminal base. When the item is brought to the terminal base, the trade ID in confirmed, the item is promptly shipped, and the virtual shopping mall operations apparatus E is notified the end of shipping process.

On the other hand, a real goods receiving managing unit 44 functions when a terminal base is designated as a place for receiving a sale item. The real goods receiving managing unit 44 manages the arrival of goods to a terminal base. The virtual shopping mall operations apparatus E is notified of the arrival of the item. The real goods receiving managing unit 44 further manages the receiving of the item by a buyer. The virtual shopping mall operations apparatus E is also notified of the end of trade. The virtual shopping mall operations apparatus E is also notified of the status of management periodically.

A commercial goods registration processing unit 46, together with the virtual shopping mall operations apparatus E, registers to a virtual shop, virtual shop information corresponding to real goods of a seller. Specifically, the commercial goods registration processing unit 46 sends the virtual shopping mall operations apparatus E virtual shop information as well as identification information of a seller. The commercial goods registration processing unit 46 then requests registration of commercial goods information. The commercial goods registration processing unit 46 then receives from the virtual shopping mall operations apparatus E, a notice notifying the end of goods registration.

A virtual goods information generating unit 48 generates virtual goods information for sellers. Virtual goods information preferably includes image data of commercial goods.

Image data is obtained by using a media equipment unit 50, an image capturing device 52, or a scanner 54. If a seller brings a recording medium that records image data of sale items, the recording media will be equipped to the media equipment unit 50 and image data is read. If a seller brings a real item, the image capturing device 52, preferably a digital camera, takes a photograph image of the real item. If a seller brings a picture of real goods, the scanner 54 as a photograph imaging device generates image data from the picture.

A camera lease managing unit 56 manages the status of leasing a camera, or an image capturing device, to sellers. A seller takes the leased camera home and takes a photograph of an item for sale by himself/herself. The seller may transfer the photographed image to his/her own terminal and upload the image to his/her virtual shop. As it is obvious from the description above, a digital camera is preferably used.

A catalog printing unit 58 prints out catalogs of virtual shops by using a printer 60. This function is used by both sellers and buyers. A seller prints a catalog of his/her items for sale registered to his/her virtual shop when he/she wants to use a medium other than the Internet, such as direct mail or an insert. A buyer gets a print on the result of the searched items or information of the purchased item.

A shop original site creating unit 62 provides a service for creating an original site of a shop for sellers. This service may target sellers who contracted a virtual shop to be of a bigger size than a given size.

A commercial goods purchase processing unit 64 is set, for buyers who want to shop at a virtual shop. A buyer can search a desired item at a virtual shop by using this function.

Figure 11:
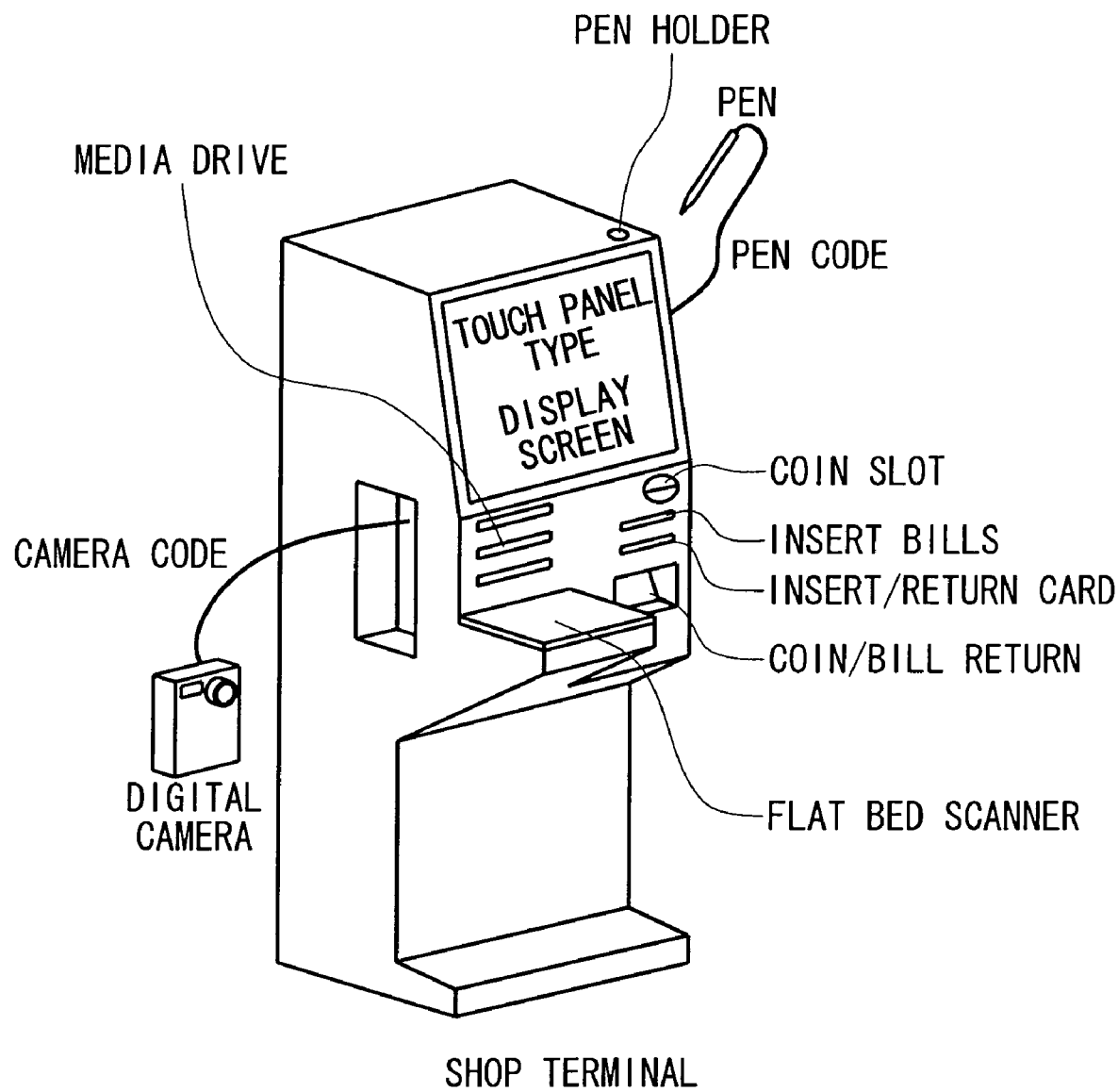
FIG. 11 is a perspective view of the terminal base unit.

FIG. 11 shows the external appearance of the terminal base unit. A user operates an application by using a touch panel display. A special pen may be used as well as fingers. A slot for inserting an ID card is set and used for certification of a registered owner. The slot may also be used for issuing an ID card for a new owner.

Further, the terminal base unit includes various media drives that can read and write image data, a digital camera for capturing images, and a flatbed scanner for reading images. The terminal base unit may be equipped with an inserted camera instead of a digital camera. Slots for inserting and returning coins and bills are used for paying an owner registration fee.

The structure of the terminal base unit is described above. Moreover, the unit for the sales clerks of a chain store to operate, and the unit for sellers and buyers to operate, may be installed independently. Both the sales clerks and sellers and buyers may also operate the same unit.

Figure 12:
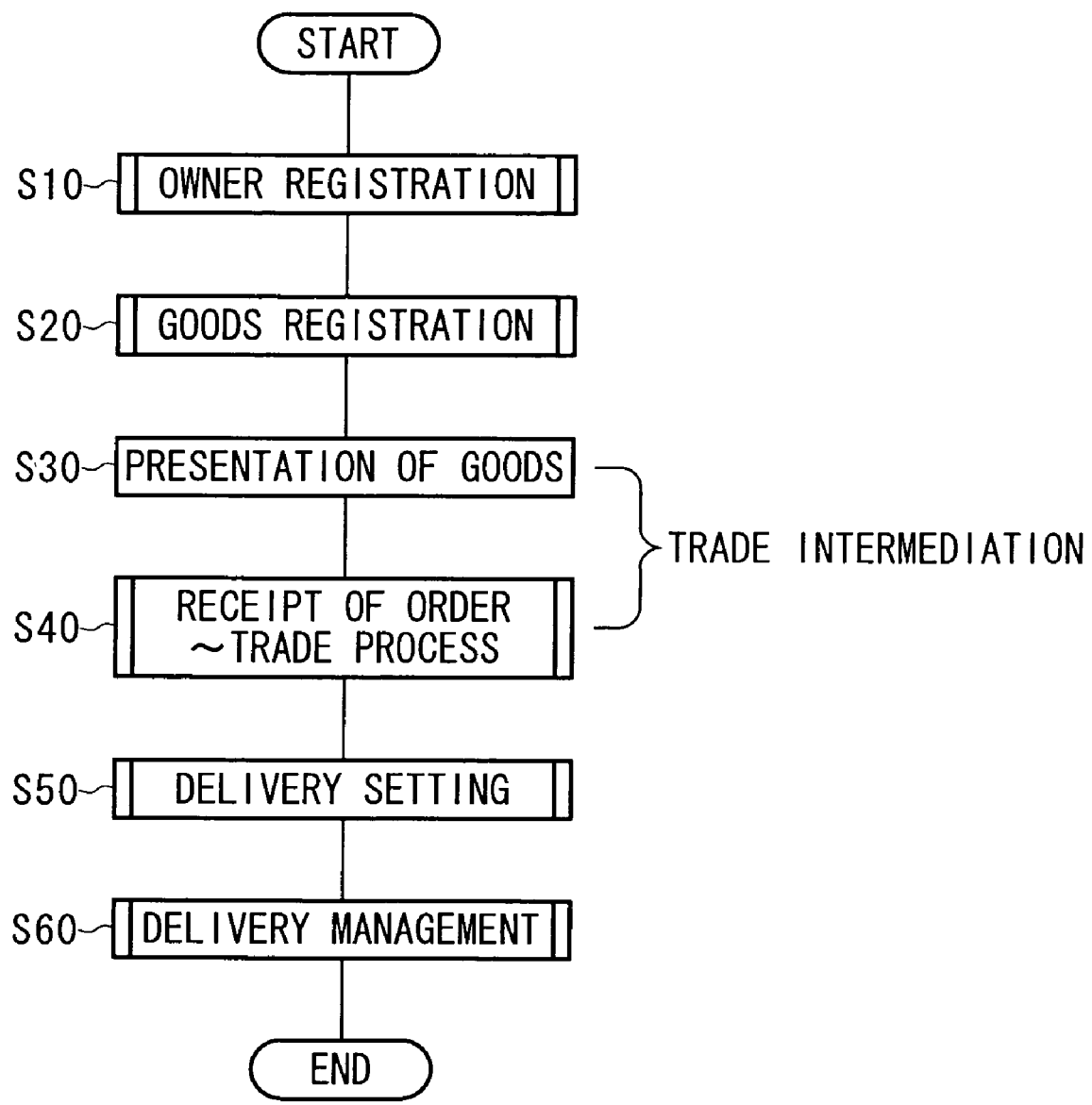
FIG. 12 is a flowchart showing the operation of the virtual shopping mall operations apparatus.

The operation of the virtual shopping mall system will be described in the following. FIG. 12 is a flowchart showing the complete operation of the virtual shopping mall operations apparatus E. First, the virtual shopping mall operations apparatus E registers a seller, who wants to be an owner of a virtual shopping mall, as an owner at step S10. The owner managing database 22 stores owner information. The management information will be rewritten according to the contacts made by the owner at a later time. An owner can be deleted from the registration.

After the owner registration, the virtual shopping mall operations apparatus E accepts virtual goods information from a seller and registers the information to a virtual shop, at step S20. The registered item will be presented to a buyer by using the Internet, at step S30. Then, the processes from receiving an order from a buyer through to trading are undertaken, at step S40. The trade between a seller and a buyer on a virtual shop is intermediated here.

When a trade on a virtual shop is reached, a delivery path of a purchased item is arranged, at step S50. Here, the shop for a buyer to receive the item is arranged. The delivering of the physical distribution system is managed so that the purchased items are moved along the delivery path, at step S60. Therefore, a purchased item is delivered from a shop, where a seller brought an item, to a designated shop. Also, at step S50, a seller may arrange a shop for bringing an item. In this case, an item is moved via two designated shops.

Figure 13:
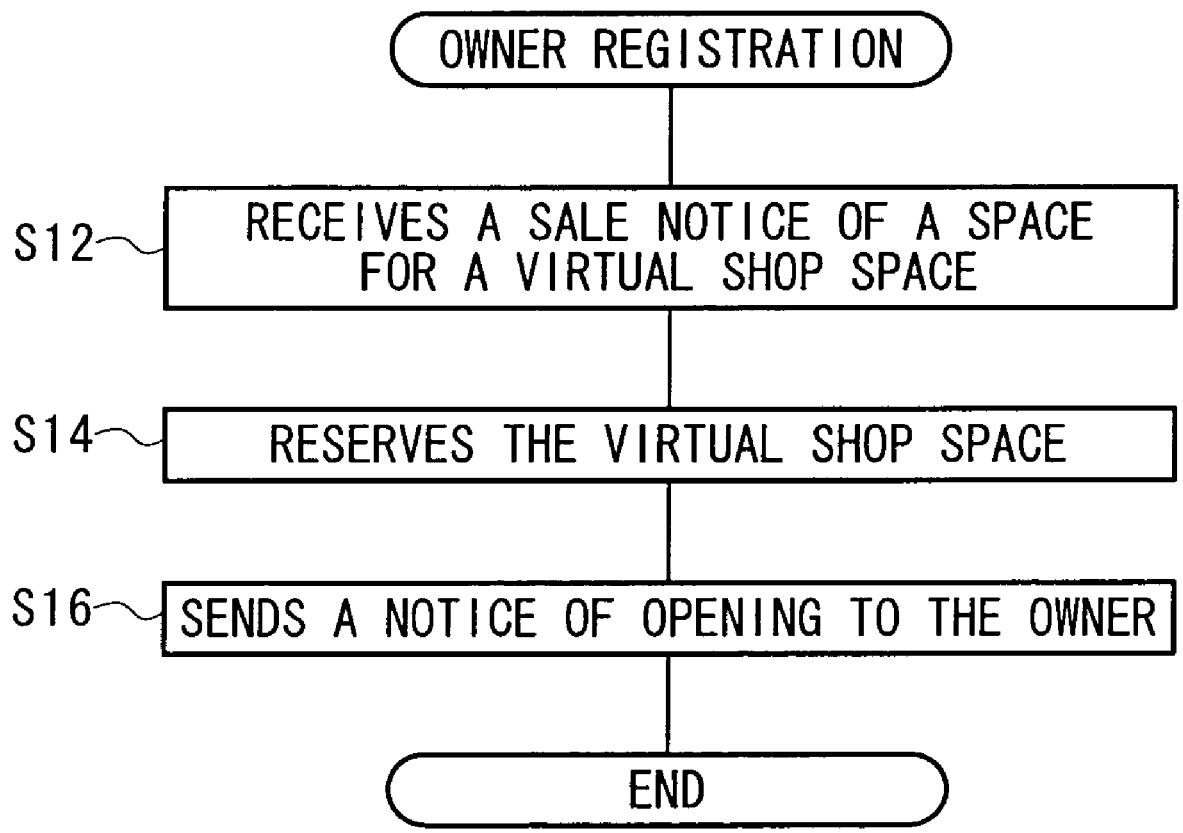
FIG. 13 is a flowchart showing the steps of owner registration in FIG. 12.

FIGS. 13, 14, 15, 16, and 17 show the details of each step in FIG. 12, respectively. FIG. 13 shows an owner registration step of FIG. 12. The virtual shop operations apparatus E receives from a terminal base unit, a notice that says a virtual shop space, which is a space for a catalog of commercial goods, was sold to a seller, at step S12. Identification information of a seller is included in the received information. The size of a virtual shop or the number of shelves may be set at this stage. Otherwise, a seller may select the size of the shop separately using his/her own terminal.

When the virtual shopping mall operations apparatus E receives a notice of sale for a virtual shop space, the apparatus records owner management information as well as reserving a virtual shop space in the commercial goods managing database 24, at step S14. Then, a space reservation notice, which is a notification of the opening of a virtual shop, is sent to an owner, at step S16.

Figure 14:
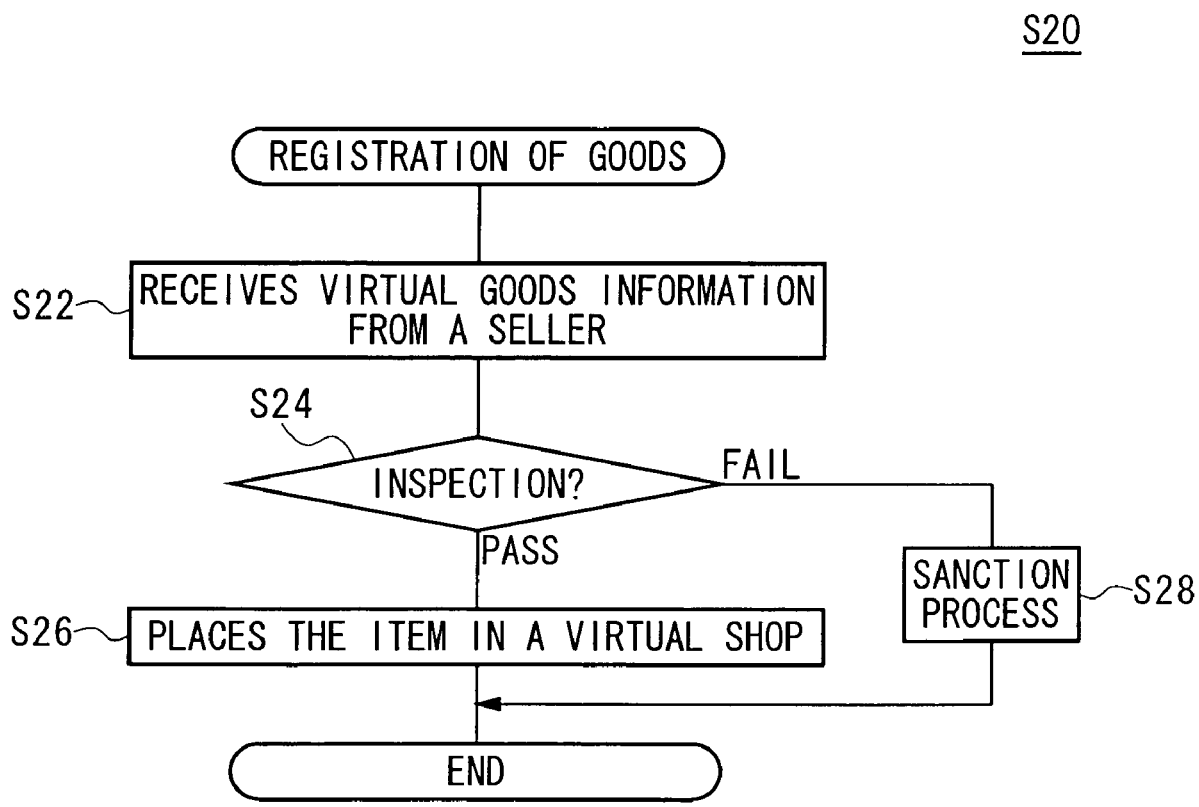
FIG. 14 is a flowchart showing the steps of commercial goods registration in FIG. 12.

FIG. 14 shows the process of registering commercial goods in FIG. 12. The virtual shopping mall operations apparatus E receives virtual goods information from a seller, at step S22. The virtual goods information is then inspected, at step S24. If the information passes the inspection, the virtual goods information is placed directly in a virtual shop space and is exhibited to buyers, at step S26. If the information does not pass inspection, the publication of the item is limited and a penalty according to predetermined penalty rules is undertaken, at step S28.

In the inspection process, whether or not registering the virtual goods information to a virtual shop is appropriate is judged. In particular, whether or not the intent of the virtual goods information agrees with the intent of an operator of the virtual shopping mall is judged. It is desirable to predetermine what kind of goods do not agree with the operator.

The inspection process may be undertaken automatically. The inspection process may also be a process that presents virtual goods information to the operator and outputs the result of judgment. Further, the first step of a pre-detailed judgment based on image data or text data may be undertaken by a computer. Then, the second step of a detailed judgment may be undertaken by the operator.

For the automatic inspection process, a keyword search for inspection may be used, for example. If this keyword hits the text data relating to the item, it is judged that the registration of the item is inappropriate. This process acts as a kind of filtering process.

Text data may be checked by a computer using the keyword search described above and image data may be presented to the operator. Image data may be checked by a computer. By applying a photo developing technique, the appropriateness of the image can be judged. An extremely dark image or an unclear image, for example, is detected.

If the image does not pass the inspection, the presentation of the virtual goods information will be limited. In that case, the limitation of the presentation may be an absolute ban or a partial ban. Also, penalty rules may be set in a step-by-step basis. For example, a warning can be given for the first breach, a penalty fee can be charged for the second breach, and a contract can be terminated for the third breach.

Figure 40:
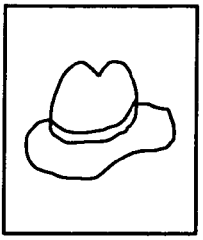
FIG. 40 is the screen page for changing information of the selected item in FIG. 39, which is displayed on the screen of the terminal base unit.
Figure 65:
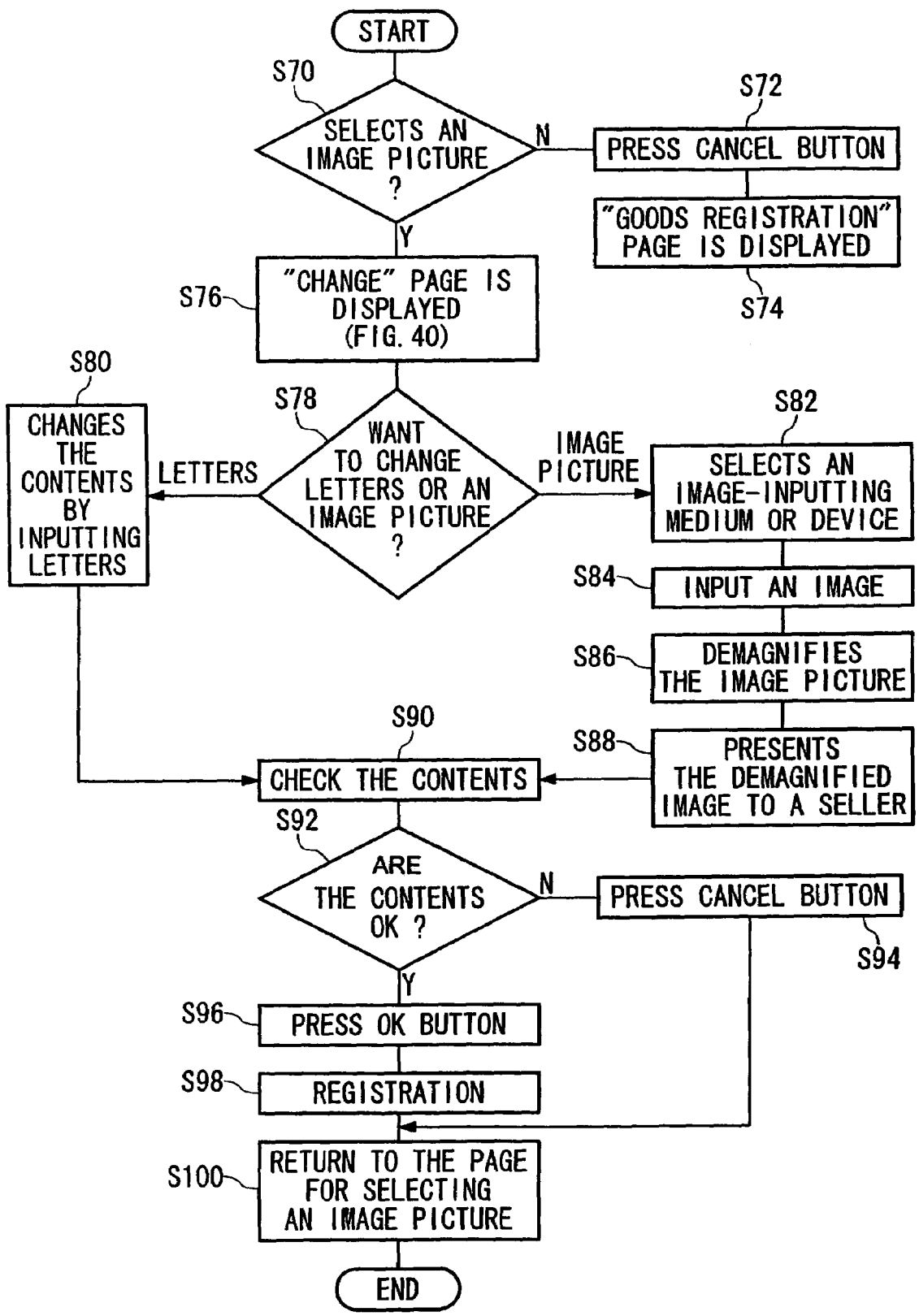
FIG. 65 is a flowchart showing the process for changing the contents of the registered goods.

If the seller wants to change the contents of the registered goods, corrections may be made by the following process as described in FIG. 65. First, the seller decides whether to select an image picture, at step S70. If the seller selects an image picture, the "change" page in FIG. 40 is displayed, at step S76. If the seller does not select an image picture and presses the cancel button, the "goods registration" page in FIG. 34 is displayed, at step S74. If the seller wants to change letters of the contents, at step S78, the seller changes the contents by selecting letters using FIG. 24, at step S80. If the seller wants to change the image picture, the seller selects a medium or a device for inputting image picture, at step S82. The terminal base unit then inputs an image picture, at step S84. The terminal base unit demagnifies the image picture to dispose a plurality of items in one frame, at step S86. The terminal base unit presents the demagnifies image picture to the seller, at step S88. After changing the contents, the seller checks the changed parts, at step S90. If the seller is satisfied with the changed contents, at step S92, the seller presses the OK button, at step S96. Then, the registration of the changed contents is completed, at step S98, and the screen page returns to the page for selecting an image picture in FIG. 39, at step S100. If the seller is not satisfied with the changed contents, the seller presses the cancel button, at step S94. The screen page then returns to the page for selecting an image picture in FIG. 39, at step S100.

Figure 15:
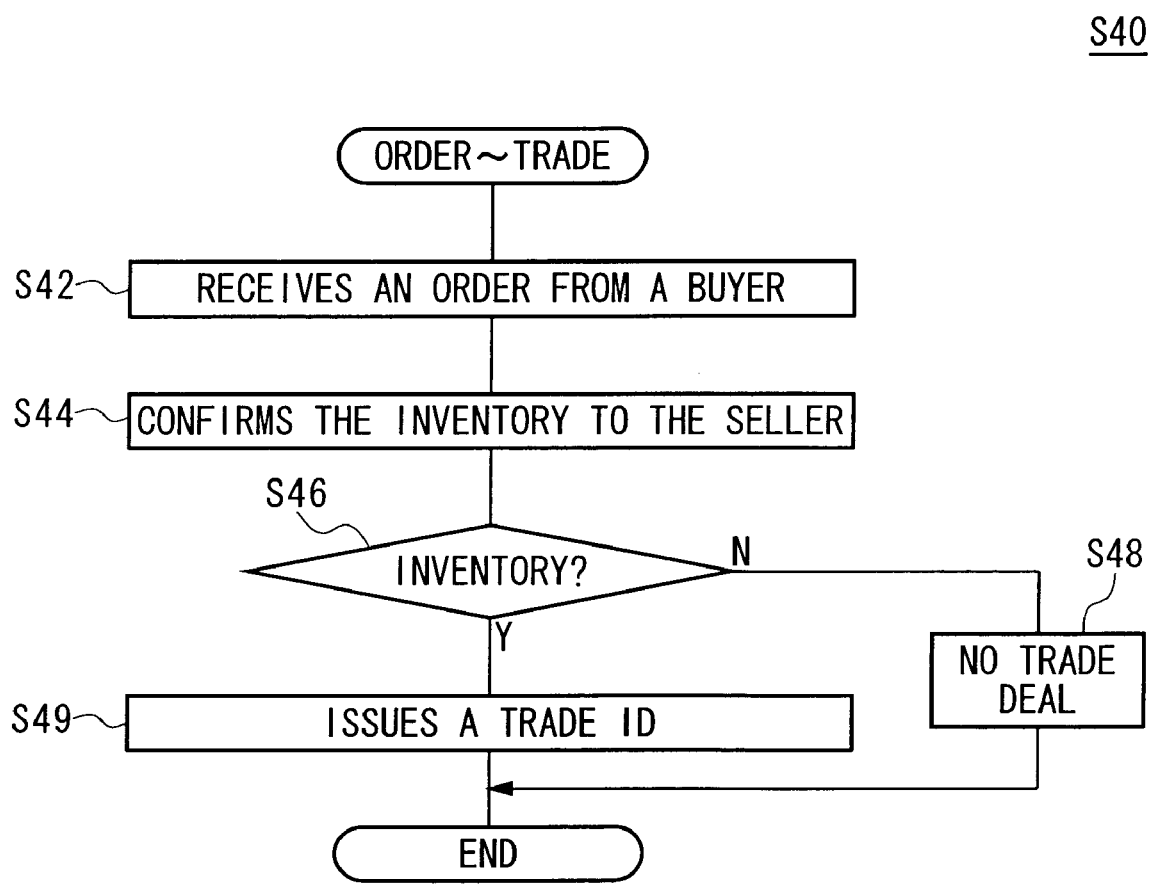
FIG. 15 is a flowchart showing the process from receiving an order through to the business transaction in FIG. 12.

FIG. 15 shows the process from acceptance of an order to trading. When the virtual shopping mall operations apparatus E receives an order from a buyer at step S42, the apparatus obtains confirmation of the stock from the seller at step S44. If the goods are not in stock, at step S46, N, trade is not reached, at step S46. If the goods are in stock, at step S46, Y, the trade is reached and a trade ID is issued, at step S49.

Figure 16:
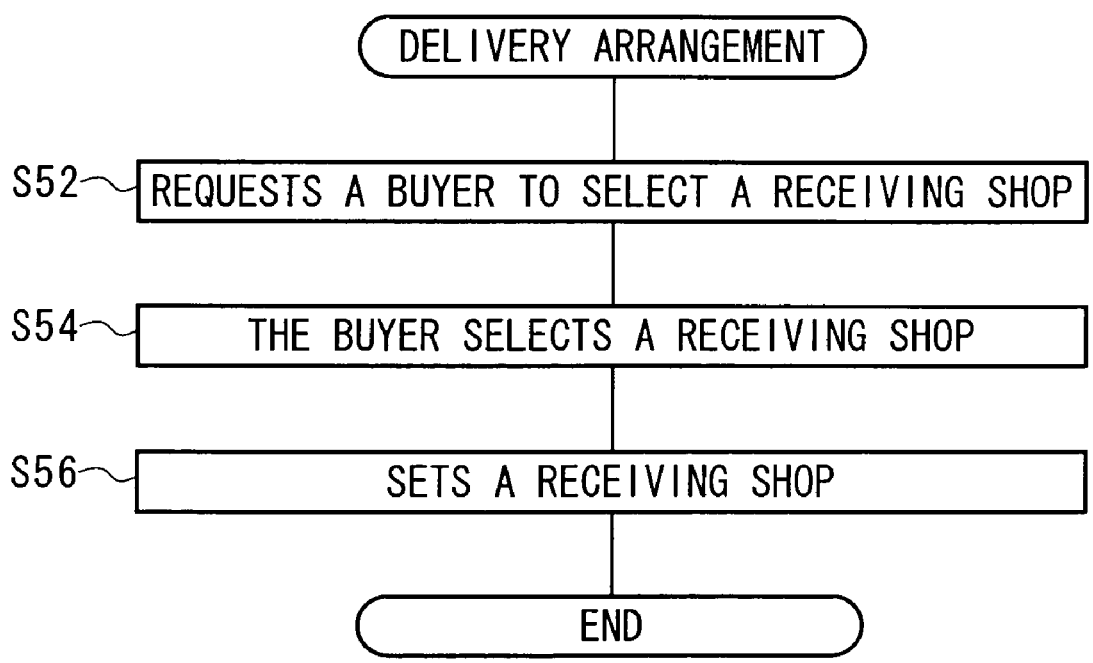
FIG. 16 is a flowchart showing the process of the delivery setting in FIG. 12.

FIG. 16 shows an exemplary process of a delivery arrangement in FIG. 12. The virtual shopping mall operations apparatus E arranges a shop for goods to be received by a buyer. First, the virtual shopping mall operations apparatus E requests a buyer to select a shop for receiving goods, at step S52. The virtual shopping mall operations apparatus E then selects a shop for receiving goods in response to this request, at step S54. For example, a list of shops is sent from the virtual shopping mall operations apparatus E to a buyer and is displayed on a terminal. A buyer selects a desired shop from the list of shops. When the address of a buyer is revealed, the nearest shop may be recommended as a default shop for receiving the goods. When a buyer selects a shop, the selected shop is arranged as the shop for receiving the goods, at step S56.

A shop for a seller to bring in goods may not be pre-designated. If the virtual shopping mall operations apparatus E arranges a shop for bringing in goods, the same process as described above can be undertaken. A shop for bringing in goods may be registered for each seller. The shop that undertook the owner registration may be initially registered as the shop for bringing in goods, for example.

The process of delivery arrangement is preferably undertaken during the trading process described above. For example, when an order of goods is sent to the virtual shopping mall operations apparatus E, the result of the selection of a shop for receiving goods is sent as well.

Figure 17:
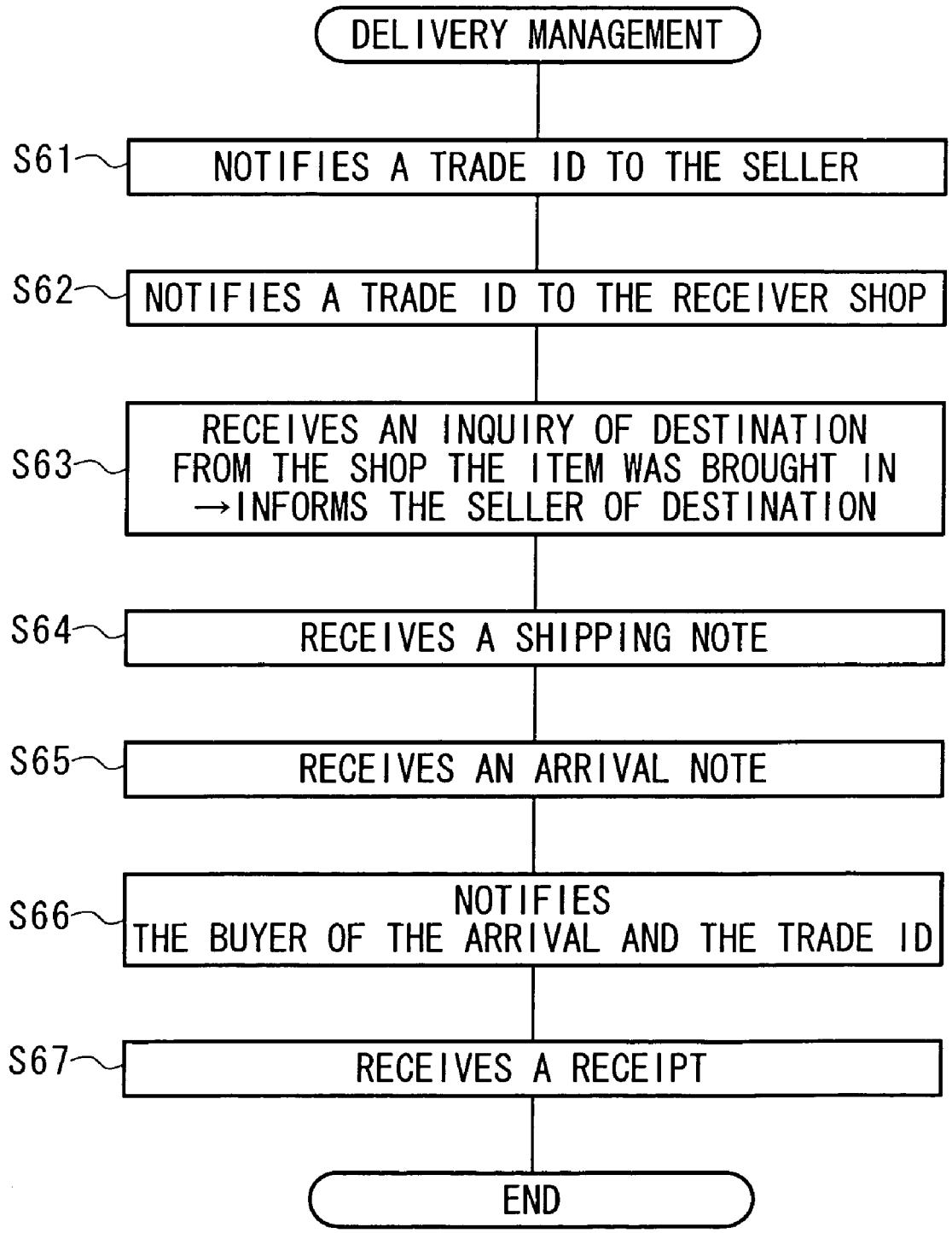
FIG. 17 is a flowchart showing the process of the delivery management in FIG. 12.

FIG. 17 shows the process of delivery management in FIG. 12. The trade ID issued at the time of a deal is notified to a seller, at step S61. The trade ID is further notified to the shop where a buyer is supposed to receive goods, at step S62. An e-mail may be used for notifying a trade ID. Telephones and faxes may also be used for notifying a trade ID. When the seller A brings goods and a trade ID to the nearest shop, there is an inquiry of destination of the goods from the shop to the virtual shopping mall operations apparatus E, at step S63. When the virtual shopping mall operations apparatus E informs the shop of the destination, the virtual shopping mall operations apparatus E receives a notice showing the end of the shipping process of the goods, at step S64.

When the goods arrive at the destination, or the shop for receiving the goods, an arrival notice is sent from the shop to the virtual shopping mall operations apparatus E, at step S65. The virtual shopping mall operations apparatus E notifies the arrival and a trade ID to a buyer, at step S66. When a buyer receives the goods at the shop, the shop sends the virtual shopping mall operations apparatus a notice for notifying the end of the trade, at step S67. The process finishes when the goods are delivered.

Figure 18:
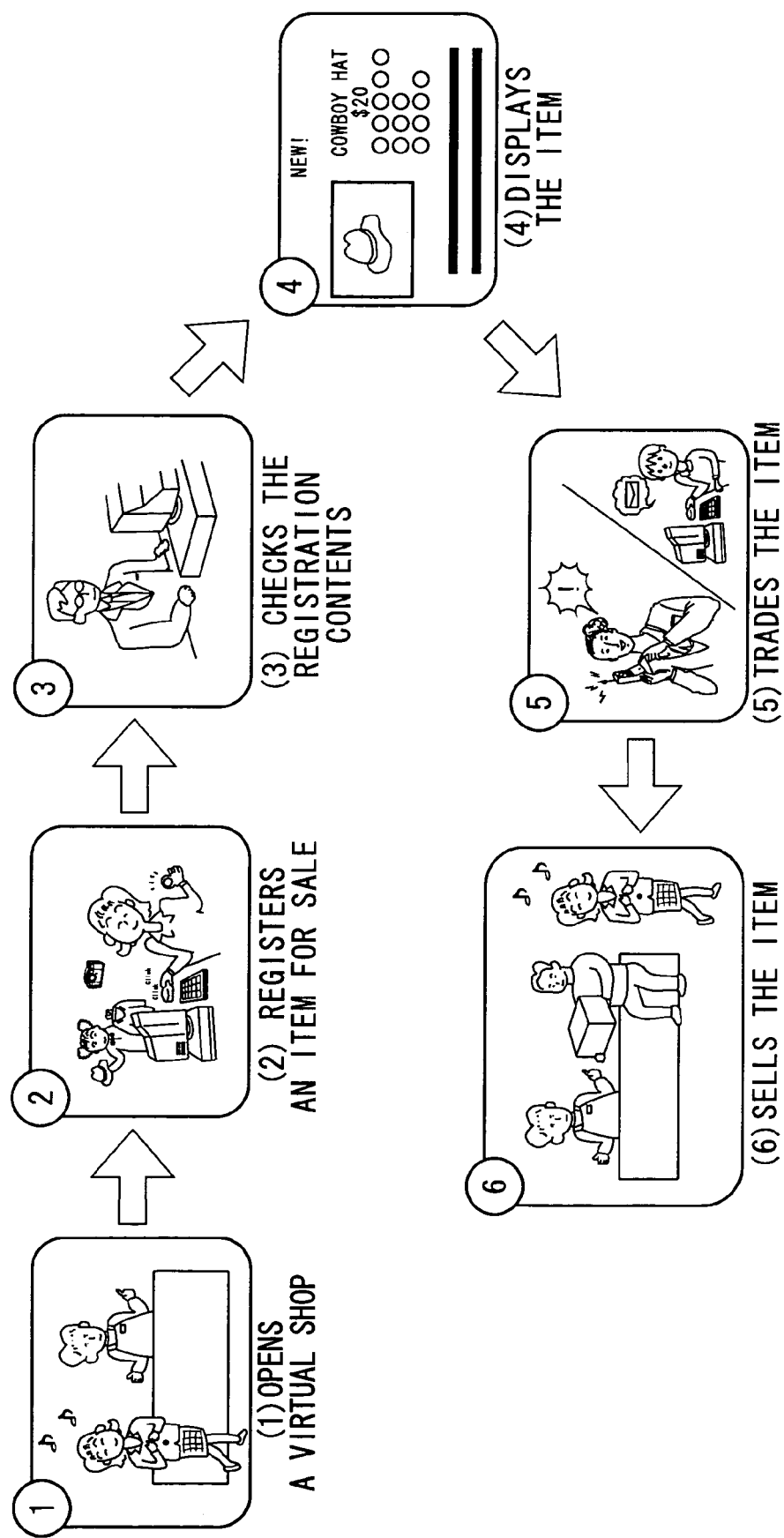
FIG. 18 shows the flow of the sales process using the virtual shopping mall system from the standpoint of a seller.

FIG. 18 shows the flow of selling goods mainly from the seller's side. (1) The opening of a virtual shop: A seller goes to the nearest shop and purchases a virtual shop space by using a terminal base unit. The seller is then registered as an owner of a virtual shop. At registration, an ID card is issued to prevent problems and for the trade safety. After owner registration, a notice for notifying the opening, or a notice for reserving a space, is sent to the seller by e-mail.

(2) The registration of goods: The seller registers goods to a virtual shop. Each seller undertakes this registration operation by himself/herself using his/her own terminal. A seller may visit a chain store and use a terminal base unit. The number of items that a seller can register at any one time is limited to the number of shelves of a store. The deletion of registration is undertaken by using a terminal.

(3) The checking of the registration contents: This procedure corresponds to the inspection process described previously. A newly registered item is checked and then judged whether or not to exhibit the item. The judgment result whether or not to exhibit is notified to a seller automatically by e-mail. When a seller requests to delete a registered item, the data of the item is deleted after confirming that no trade is presently made on the corresponding item.

(4) The exhibition of goods; Goods of the seller are exhibited on a virtual shop on the Internet.

(5) The trade of goods: When a buyer sends an order to a virtual shop, the virtual shopping mall operations apparatus E automatically sends an order mail to the sheller. The seller checks the stock of the corresponding item. If the item is in stock, a seller communicates to the virtual shopping mall operations apparatus E by e-mail that the item is in stock. The seller then receives a trade ID, which a virtual shop has issued, by e-mail. The trade ID is also issued to the buyer.

(6) The sale of goods: The seller brings an item for sale to the nearest shop and presents a trade ID to a sales clerk of the shop. The seller receives payment in exchange for the item. Since a buyer pays at a shop, the payment process is very safe. The payment is the amount with shipping and handling being deducted from the total fee. The shipping and handling may be paid separately. An electronic payment may be used.

Figure 19:
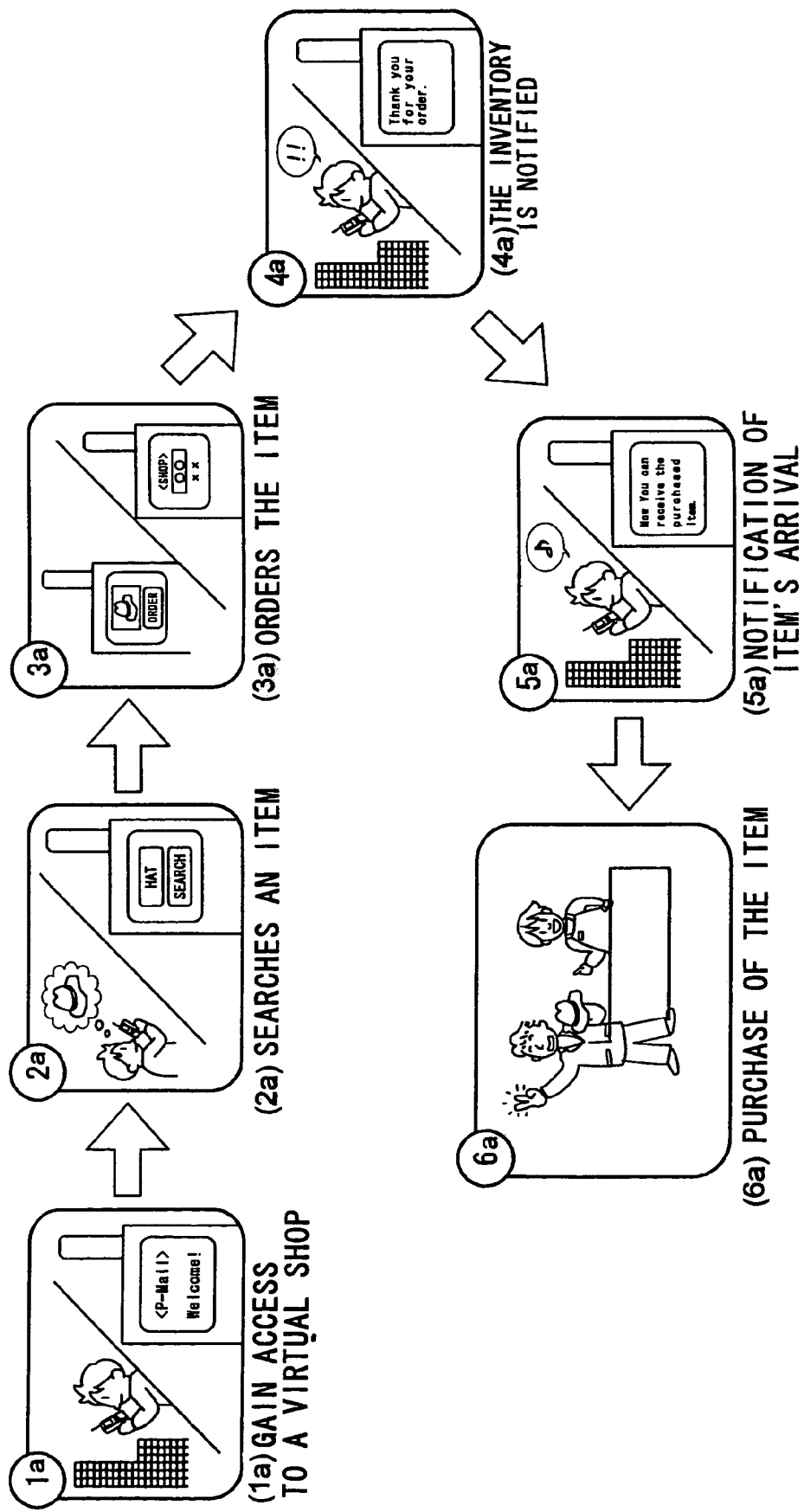
FIG. 19 shows the flow of the purchase process using the virtual shopping mall system from the standpoint of a buyer.

FIG. 19 shows the flow of purchasing goods mainly from the buyer's side. (1a). Accessing a virtual shop: A buyer visits the Web site of an operator of the virtual shopping mall by using a terminal that can gain access to the Internet, such as a personal computer or a cellular phone. A buyer is not required to register a membership specifically.

(2a) Searching goods: A buyer searches desired goods on the Web site. The buyer is then presented with the desired goods.

(3a) Ordering goods: When the buyer finds the desired goods, the buyer presses the order button on a terminal. When the screen page for selecting a shop is displayed in response to this operation, the buyer selects an appropriate shop as a place for receiving the purchased goods. When a buyer makes an order, the buyer discloses his/her email address to the virtual shopping mall operations apparatus E by using a terminal base unit.

(4a) Notifying the stock: The buyer receives a notice of whether or not the goods are in stock. Checking the stock is undertaken between the operator of the virtual shopping mall and the seller. If the goods are in stock, the buyer enters into the waiting state of delivery. If the goods are not in stock, no trade is readied.

(5a) The notice for arrival of the purchased goods: The buyer receives an e-mail that notifies the arrival of the purchased goods at the designated shop. This e-mail includes a trade ID.

(6a) Purchasing goods: The buyer visits the designated shop to receive the purchased goods, taking the trade ID with him/her. The buyer presents the trade ID to a sales clerk, receives the purchased goods, and makes payment. The payment is transmitted to an appropriate place, such as the headquarters of the chain store.

As described above, according to the present invention, a catalog of commercial goods as a virtual shopping mall, a window for accepting requests to edit a catalog, a window for accepting an order of goods, and an information center for various question inquiries, exist on the Internet as a unit from sellers' and buyers' point of view.

From FIGS. 20 to 63 are various screen pages, which are displayed on a terminal base unit installed at a chain store. By referring to these figures, various functions of the terminal base unit and the virtual shopping mall system will be described in the following. The main functions of the terminal base unit is "the owner registration," "the goods registration," "the obtaining of images for registering goods," "the searching of goods," and "the ordering of goods."

Figure 20:
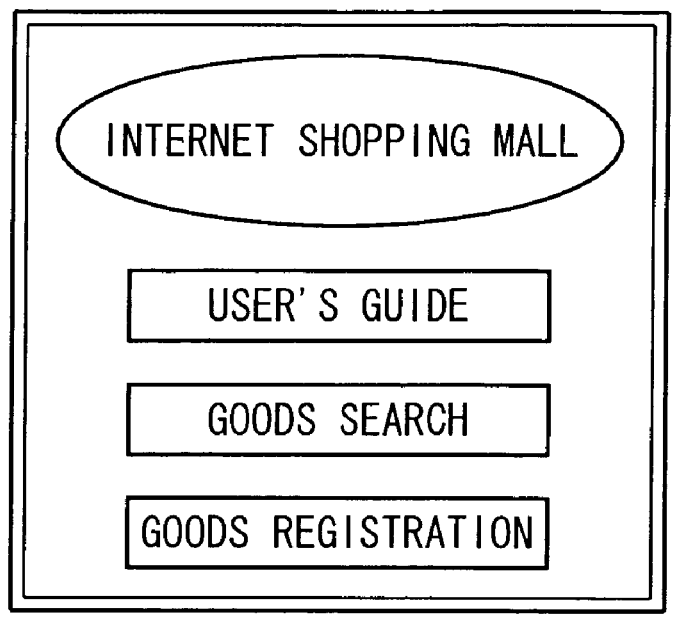
FIG. 20 is the screen page of the home site of the virtual shopping mall, which is displayed on the screen of the terminal base unit.

FIG. 20 is the screen page of the home site of the virtual shopping mall. The screen page switches to another page according to what button a user selects. Therefore, when a seller presses the user's guide button, the goods search button, or the goods registration button, the "user's guide" page as in FIG. 32, the "goods search" page as in FIG. 52, or the "request for a shop owner card" page as in FIGS. 21 will be displayed on the screen, respectively.

Figure 21:
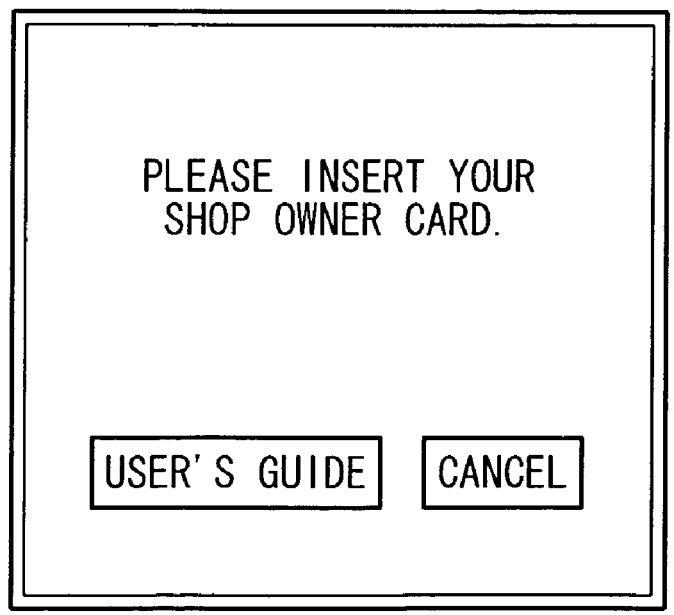
FIG. 21 is the screen page for requesting a shop owner card, which is displayed on the screen of the terminal base unit.

FIG. 21 is the screen page for requesting a shop owner card. If a seller is already an owner of a virtual shop, the seller inserts his/her owner card into a predetermined card slot. If a seller registers himself/herself as an owner for the first time, the seller inserts a maintenance card, which is used for managing virtual shops. When a seller inserts an owner card, the "user certification" page as in FIG. 33 will be displayed. When a user inserts a maintenance card, the "maintenance mode" page as in FIG. 22 will be displayed. When a seller presses the user's guide button, the "user's guide" page as in FIG. 32 will be displayed. When a seller presses the cancel button, the "home site" page as in FIG. 20 will be displayed.

Figures 22, 23:
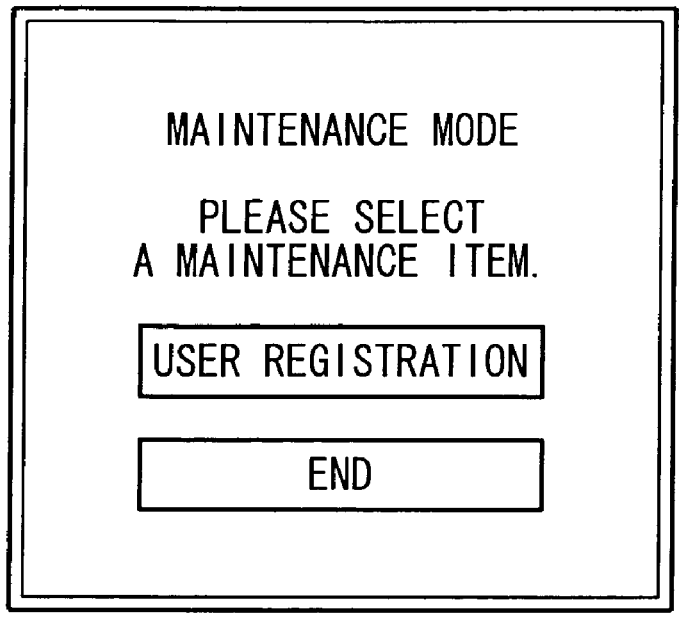
FIG. 22 is the screen page for selecting a maintenance mode, which is displayed on the screen of the terminal base
FIG. 23 is the screen page for registering user information, which is displayed on the screen of the terminal base unit.

FIG. 22 is the screen page for selecting a maintenance mode. A new owner is registered in this maintenance mode.

A sales clerk of shop may undertake this registration operation. Otherwise, a seller, who is going to be an owner, may undertake this operation. If a seller presses the user registration button, which corresponds to the owner registration, the "user registration" page as in FIG. 23 will be displayed. If a seller presses the end button, a page that asks the seller to receive an owner card as in FIG. 31 will be displayed. The shop owner card is then ejected from the card slot.

FIG. 23 is the screen page for registering user information. When an operator, that is, a seller or a sales clerk, presses each item, the page for entering letters as in FIG. 24 will be displayed. A seller enters letters by using this screen page. When a seller finishes entering letters, that is, when the OK button is pressed, the screen page as in FIG. 23 will be displayed again.

Figures 24, 25:
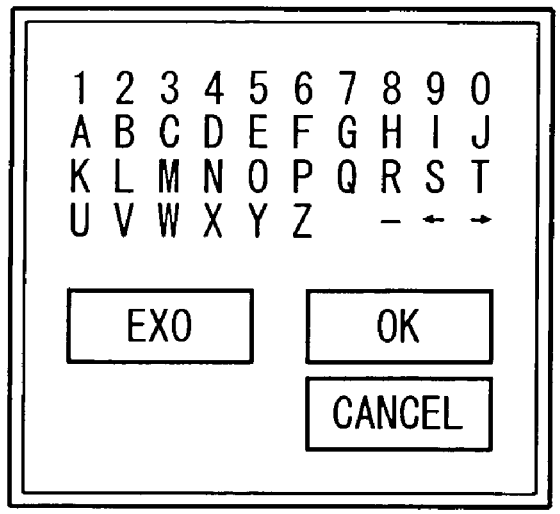
FIG. 24 is the screen page for entering letters, which is displayed on the screen of the terminal base unit.
FIG. 25 is the completed screen page for registering user information, which is displayed on the screen of the terminal base unit.

FIG. 24 is the screen page for entering letters. This screen page is for entering letters using a terminal base unit at a shop, which does not have a keyboard. A user selects a letter by moving a cursor using the arrows placed at the middle right side. The use of this page is not limited to the entry of user information. This screen page is used for every operation where it is necessary to enter letters, FIG. 25 is the second screen page for registering user information. This screen page shows the completed form of FIG. 23. If a seller presses the OK Button, a "user registration" page as in FIG. 26 will be displayed. If a seller presses the cancel button, the "maintenance mode" page as in FIG. 22 will be displayed.

Figure 26:
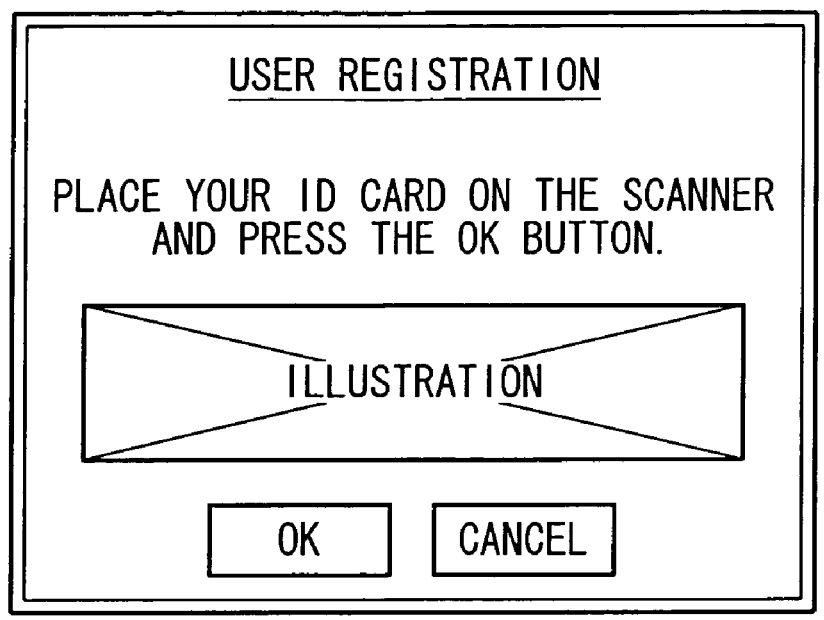
FIG. 26 is the screen page for ID card recognition, which is displayed on the screen of the terminal base unit.

FIG. 26 is the screen page for recognizing an ID card. If an operator places an ID card on the flatbed scanner of the terminal base unit and presses the OK button, the scanned image will be accepted. The "user registration" page for deciding a password as in FIG. 27 will also be displayed if an operator presses the OK button. If an operator presses the cancel button, the "maintenance mode" page as in FIG. 22 will be displayed.

Figure 27:
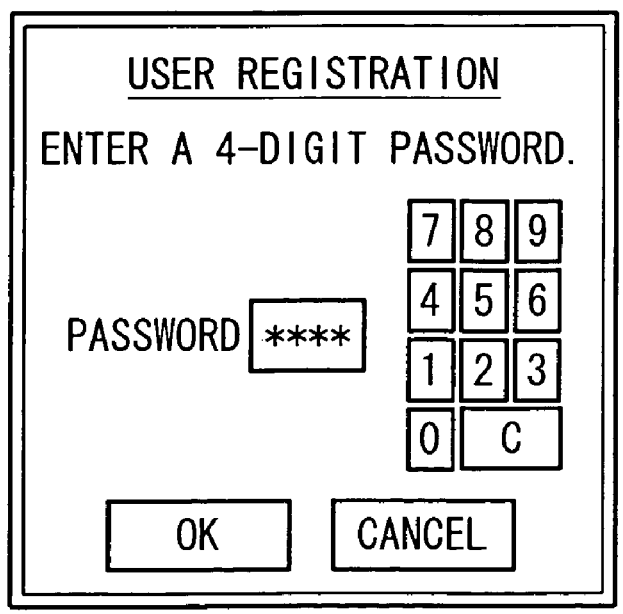
FIG. 27 is the screen page for deciding a password, which is displayed on the screen of the terminal base unit.

FIG. 27 is the screen page for deciding a password. A seller decides a four-digit password and inputs the password. The password is used for the authentication at the time of goods registration and so on. If a seller presses the OK button, a "user registration" page for requesting payment of the registration fee as in FIG. 28 will be displayed. If a seller presses the cancel button, the "maintenance mode" page as in FIG. 22 will be displayed.

Figure 28:
FIG. 28 is the screen page requesting payment of the registration fee, which is displayed on the screen of the terminal base unit.

FIG. 28 is the screen page for requesting payment of the registration fee. A seller pays the request registration fee. When a seller completes payment, a "user registration" page for issuing a shop owner card as in FIG. 29 will be displayed. If a seller presses the cancel button, the "maintenance mode" page as in FIG. 22 will be displayed.

Figure 29:
FIG. 29 is the screen page for receiving a shop owner card, which is displayed on the screen of the terminal base unit.

FIG. 29 is the screen page for issuing a shop owner card. A seller receives a shop owner card as issued by a terminal base unit. After a seller receives a shop owner card, the "user registration" page for notifying the completion of the registration as in FIG. 30 will be displayed.

Figure 30:
FIG. 30 is the screen page for notifying the end of the user registration.

FIG. 30 is the screen page for notifying the completion of the user registration. An ID number of a new owner is issued at this page. The ID number is a ten-digit number, which is a combination of the displayed six-digit number plus the seller's four-digit password. If a seller presses the OK button, the "maintenance mode" page as in FIG. 22 will be displayed.

Figure 31:
FIG. 31 is the screen page for returning a shop owner card, which is displayed on the screen of the terminal base unit.

FIG. 31 is the screen page for returning a shop owner card. A shop owner card or a maintenance card is ejected from the terminal base unit and is returned to a seller. When an operator receives a card, the "home site" page will be displayed.

Figure 32:
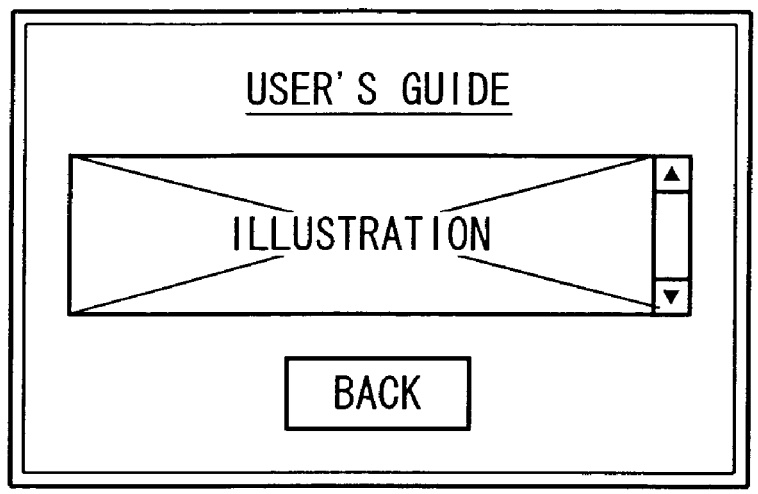
FIG. 32 is the screen page of the user's guide, which is displayed on the screen of the terminal base unit.

FIG. 32 is the screen page of the "user's guide". Information of how to use this service, or a virtual shopping mall, is described in this page. If an operator presses the back button, the former page will be displayed.

Figure 33:
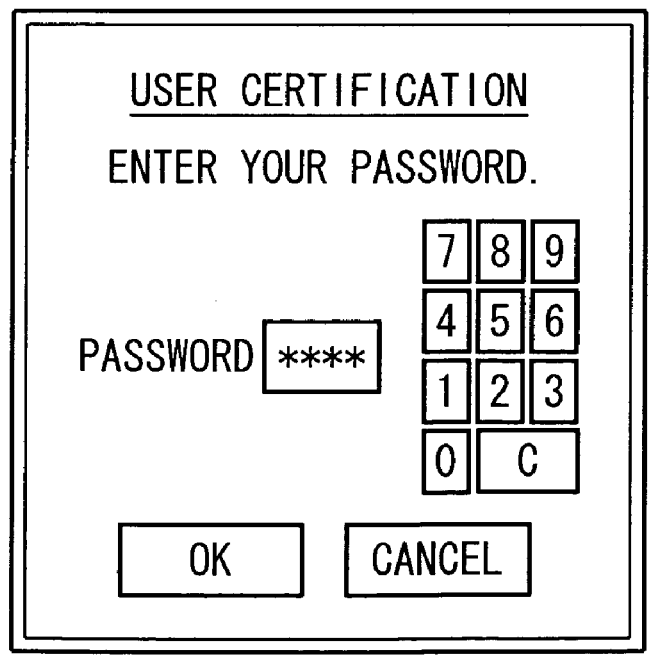
FIG. 33 is the screen page for entering a password, which is displayed on the screen of the terminal base unit.

Screen pages from FIG. 33 and onwards are used for registering goods. FIG. 33 is the screen page for inputting a password to authenticate a user. A seller inputs his/her four-digit password. Since a shop owner card has been already inserted, a seller does not need to input the entire ten-digit ID number. If a seller presses the OK button, the home site of the "goods registration" page as in FIG. 34 will be displayed. If a seller presses the cancel button, the page for returning a shop owner card as in FIG. 31 will be displayed.

FIG. 34 is the screen page of the home site for registering a sales item. This page shows the menu used for managing the registration of goods. The screen page switches to another page according to the operation of buttons. If a seller presses the new registration button, the "new registration" page for registering new goods as in FIG. 35 will be displayed. If a seller presses the confirmation button, the "confirmation" page for confirming goods as in FIG. 37 will be displayed. If a seller presses the change button, the "change" page for selecting an item to change as in FIG. 39 will be displayed. If a seller presses the delete button, the "deletion" page for selecting an item to delete as in FIG. 41 will be displayed. If a seller presses the user's guide button, the "user's guide" page as in FIG. 32 will be displayed. And if a seller presses the end button, the page for requesting to receive a shop owner card as in FIG. 31 will be displayed.

FIG. 35 is the first screen page for a new registration of a sales item. A seller registers data of new registering goods. A seller inputs letters into each column of the name of goods, the price, and the comment, by using the page for inputting letters as in FIG. 24. A seller selects YES or NO for the column of "disclosure of shop name," depending on whether or not a seller wants anonymity. If a seller presses the change button, the "image input" page for entering an image of an item to register as in FIG. 43 will be displayed. The operation of inputting image pictures then follows. When the inputting of images is completed. The screen page of FIG. 35 will be displayed again.

Figures 36, 37:
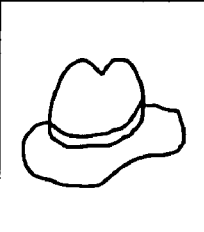
FIG. 36 is the completed screen page for entering the new registration of a sales item, which is displayed on the screen of the terminal base unit.
FIG. 37 is the screen page for selecting an item to see detailed information, which is displayed on the screen of the terminal base unit.

FIG. 36 is the second screen page for the new registration of a sales item. The inputting of all the blank spaces including images is completed. If a seller presses the OK button, the home site of the "goods registration" page as in FIG. 34 will be displayed. If a seller presses the cancel button, the home site of the "goods registration" page as in FIG. 34 will also be displayed.

FIG. 37 is the screen page for selecting an item to see detailed information. A seller designates a picture item of goods for more information. If a seller selects an image item, the "detailed information" page as in FIG. 38 will be displayed. If a seller presses the cancel button, the home site of the "goods registration" page as in FIG. 34 will be displayed.

Figures 38, 39:
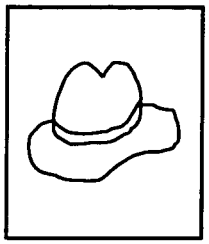
FIG. 38 is the screen page for showing detailed information of the selected item, which is displayed on the screen of the terminal base unit.
FIG. 39 is the screen page for selecting a registered item to change information, which is displayed on the screen of the terminal base unit.

FIG. 38 is the screen page for showing detailed information of the selected item. The detailed information of registered goods is displayed. If a seller presses the back button, the "confirmation" page as in FIG. 37 will be displayed.

FIG. 39 is the screen page for selecting a registered item to change information. A seller designates an image picture of goods to change the information contents. If a seller selects an image picture, the "change" page for changing the contents as in FIG. 40 will be displayed. If a seller presses the cancel button, the home site of the "goods registration" page as in FIG. 34 will be displayed.

Figures 42, 43:
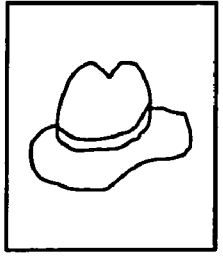
FIG. 42 is the screen page for deleting the selected item in FIG. 41, which is displayed on the screen of the terminal base unit.
FIG. 43 is the screen page of the home site for entering an image of an item to be registered, which is displayed on the screen of the terminal base unit.

FIG. 40 is the screen page for changing selected item information. The registered goods information is displayed in this page. A seller changes the contents of the column which the seller wants to change. A seller then presses the OK button. For changing the letters, the page for inputting letters as in FIG. 24 is used. For changing an image picture, the "image input" page as in FIG. 43 is used. If a seller presses the OK button, the "change" page as in FIG. 39 will be displayed. If a seller presses the cancel button, the "change" page as in FIG. 39 will also be displayed.

Figure 41:
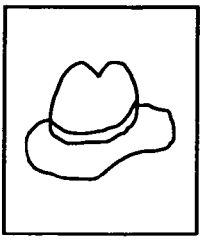
FIG. 41 is the screen page for selecting a registered item to delete from the sale list, which is displayed on the screen of the terminal base unit.

FIG. 41 is the screen page for selecting a registered item to be deleted from the sale list. A seller designates an image picture of goods to be deleted from the sale list. If a seller selects an image picture, the "detailed information" page for confirming deletion of the item as in FIG. 42 will be displayed. If a seller presses the cancel button, the home site of the "goods registration" page as in FIG. 34 will be displayed.

FIG. 42 is the screen page for deleting the selected item in FIG. 41. The information of registered goods is displayed in this page. When a seller deletes an item, the seller presses the OK button. If a seller presses the OK button, the "deletion" page for selecting an item to be deleted as in FIG. 41 will be displayed. If a seller presses the cancel button, the "deletion" page as in FIG. 41 will also be displayed.

FIG. 43 is the screen page of the home site for entering an image of an item for registration. This screen page shows the menu of media and devices and is used for inputting image pictures. Images are input from media, such as a memory card and flexible disk, a camera, or a scanner.

The FIG. 43 page is switched to another page according to the operation of the buttons. If a seller presses a medium button, such as smart media button, zip button, and FLOPPY DISK button, the "media insert" page as in FIG. 44 will be displayed. If a seller presses the digital camera button, the "input by camera" page as in FIG. 48 will be displayed. If a seller presses the scanner button, the "input by scanner" page as in FIG. 50 will be displayed. And if a seller presses the cancel button, the former page will he displayed.

Figure 44:
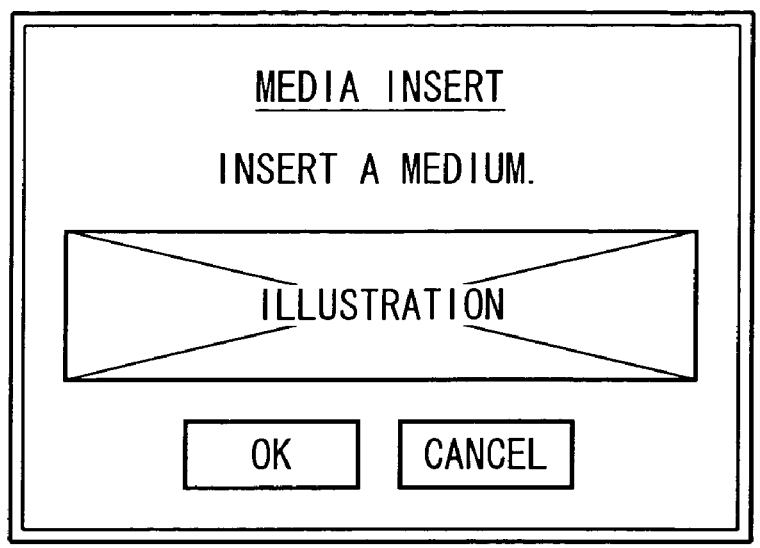
FIG. 44 is the screen page for inserting a recording medium, which is displayed on the screen of the terminal base unit.

FIG. 44 is the screen page for inserting a recording medium. A seller inserts a medium into the designated drive and presses the OK button. If a seller presses the OK button, the "media insert" page for selecting a folder as in FIG. 45 will be displayed. If a seller presses the cancel button, the "image input" page as in FIG. 43 will be displayed again.

Figure 45:
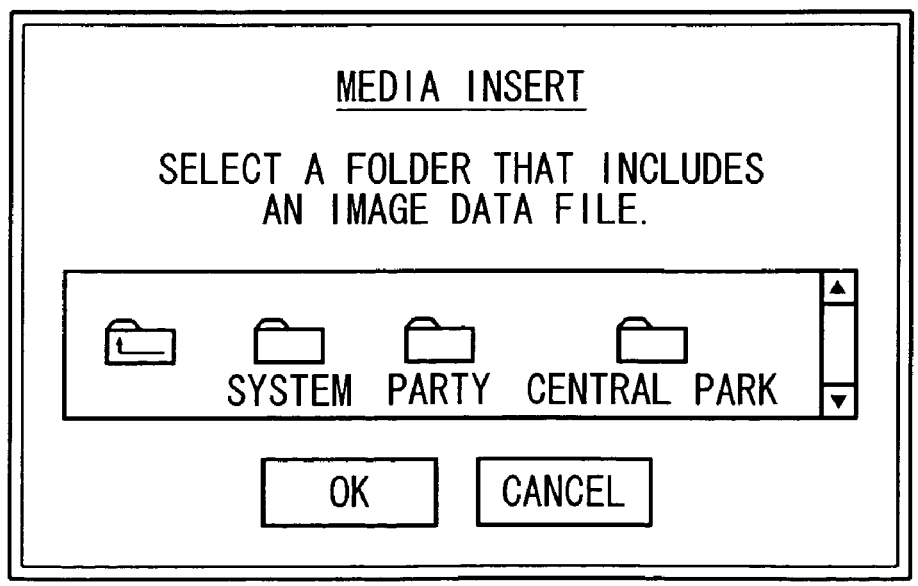
FIG. 45 is the screen page for selecting a folder that includes image files, which is displayed on the screen of the terminal base unit.

FIG. 45 is the screen page for selecting a folder that includes image files. A seller selects a folder that stores the desired image data file and presses the OK button. If a seller presses the OK button, the "media insert" page for selecting a file as in FIG. 46 will be displayed. If a seller presses the cancel button, the "media insert" button as in FIG. 44 will be displayed.

Figure 46:
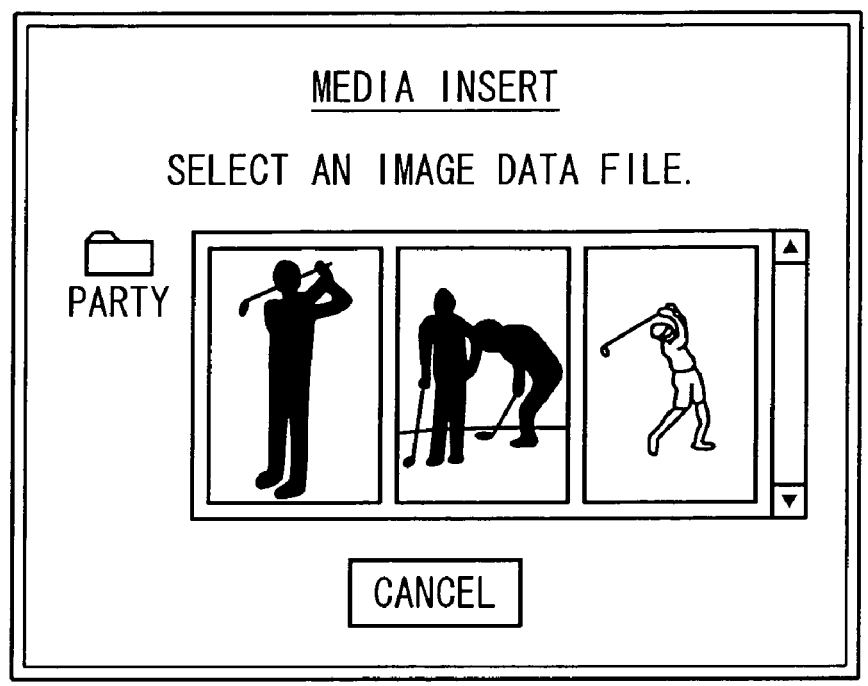
FIG. 46 is the screen page for selecting an image file, which is displayed on the screen of the terminal base unit.

FIG. 46 is the screen page for selecting an image file. Images in the selected folder are shown by a list. A seller selects a desired image from the list. If a seller selects an image, the "media insert" page for confirming the image as in FIG. 47 will be displayed. If a seller presses the cancel button, the "media insert" page for selecting a folder as in FIG. 45 will be displayed again.

Figure 47:
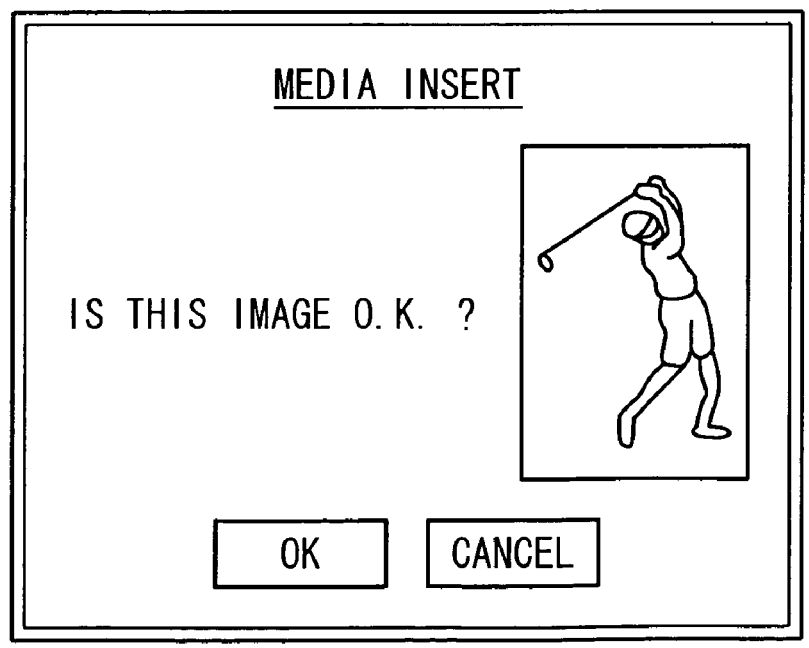
FIG. 47 is the screen page for confirming the selected image, which is displayed on the screen of the terminal base unit.

FIG. 47 is the screen cage for confirming the selected image. If a seller confirms an image and presses the OK button, a screen page to continue the proceedings will be displayed. If a seller presses the cancel button, the "media insert" page for selecting a file as in FIG. 46 will be displayed.

Figure 48:
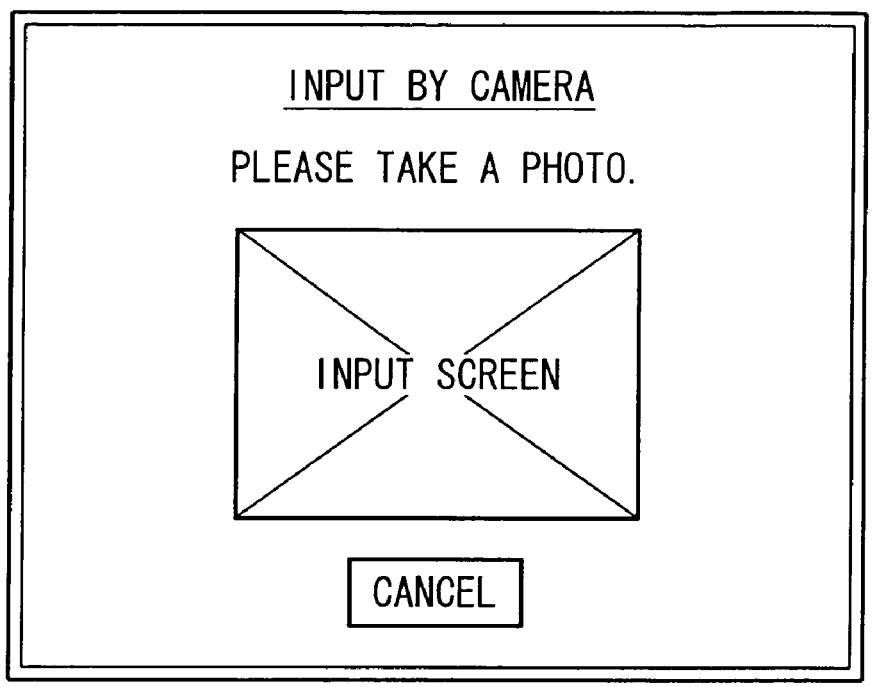
FIG. 48 is the screen page for taking a photograph with a digital camera, which is displayed on the screen of the terminal base unit.

FIG. 48 is the screen page for taking a photograph with a digital camera. A seller takes a photograph of goods with a digital camera installed on the terminal base unit at a shop, according to the screen page instructions. The image transferred from the digital camera will be displayed in real time on the screen of the terminal base unit, by the through process. If the photographing operation is conducted, the "input by camera" page for checking a taken image as in FIG. 49 will be displayed. If a seller presses the cancel button, the "image input" page as in FIG. 43 will be displayed.

Figure 49:
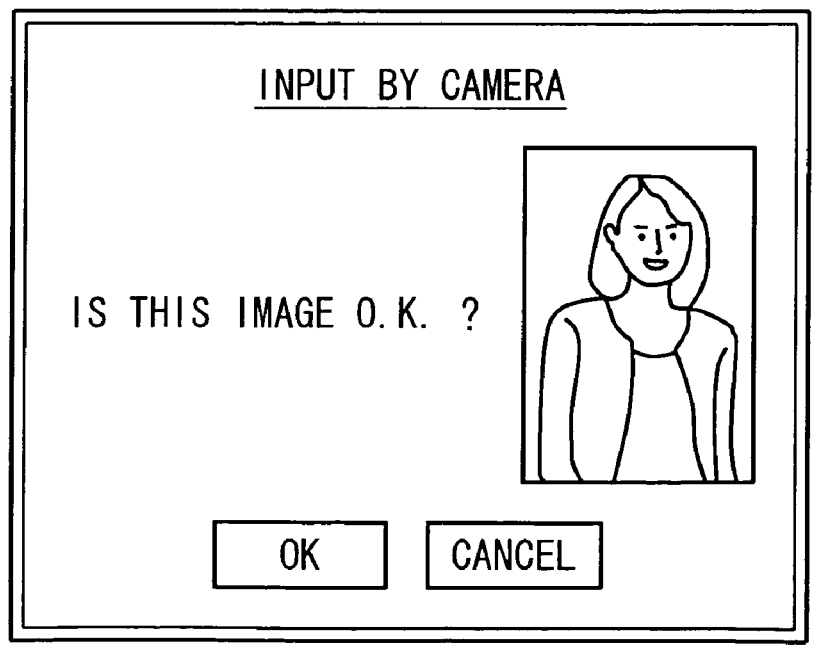
FIG. 49 is the screen page or confirming the photographed image, which is displayed on the screen of the terminal base unit.

FIG. 49 is the screen page for confirming the photographed image. If a seller checks the image picture and presses the OK button, a screen page to continue the proceedings will be displayed. If a seller presses the cancel button, the "input by camera" page for taking a photograph as in FIG. 48 will be displayed.

Figure 50:
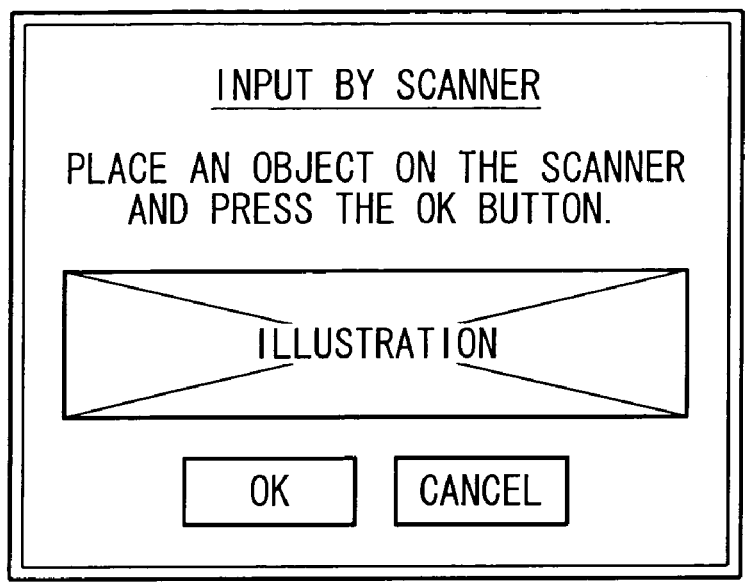
FIG. 50 is the screen page for scanning an image, which is displayed on the screen of the terminal base unit.

FIG. 50 is the screen page for scanning an image. A seller places a photograph of goods on the scanner installed on the terminal base unit. The scanner then accepts the image data of the picture. It an image is accepted, the "input by scanner" page for checking the scanned image as in FIG. 51 will be displayed. If a seller presses the cancel button, the "image input" page as in FIG. 43 will be displayed.

Figure 51:
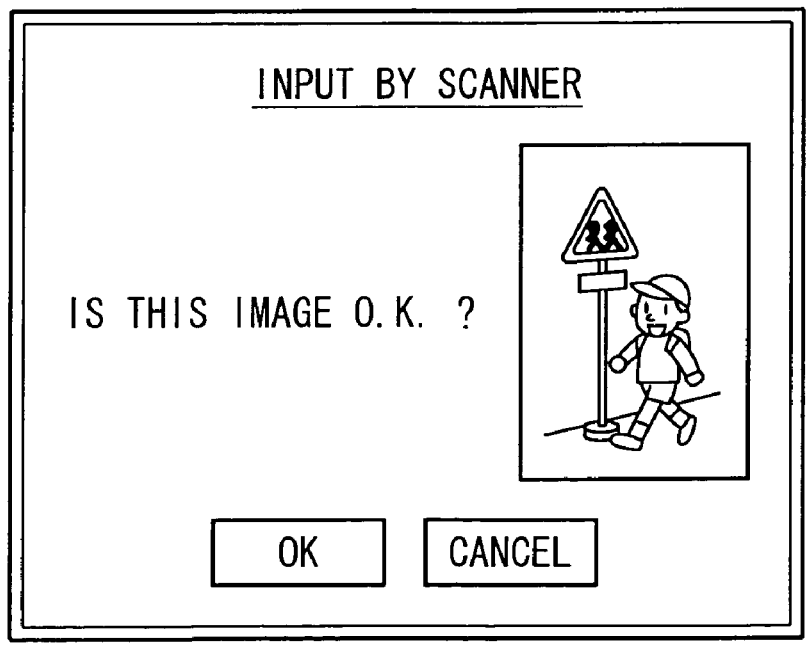
FIG. 51 is the screen page for confirming the scanned image, which is displayed on the screen of the terminal base unit.

FIG. 51 is the screen page for confirming the scanned image. If a seller confirms the scanned image and presses the OK button, a screen page to continue the proceedings will be displayed. If a seller presses the cancel button, the "input by scanner" page for placing a picture as in FIG. 50 will be displayed.

FIG. 52 to FIG. 60 are used for searching and purchasing goods. The following figures show the buyer functions.

FIG. 52 is the first screen page of the home site for searching an item. The process for a buyer to be presented goods starts from here. A buyer inputs conditions into blank spaces for each item to search a specific item. When a buyer inputs keywords, keywords will be searched from among the named goods, the named shop, and the comments. Each item of the named goods, the named shop, the price, and the keyword is connected with "AND" in the search style. A buyer does not need to complete all of the items.

The category column issued for designating the category of the goods list. A buyer can select from the five modes of "no category," "shop" "category," "sale date," and "price."

FIG. 53 is the second screen page for searching an item. This screen page shows the completed search conditions made by a buyer. If a buyer presses the OK button, a goods list according to the category selection will be displayed. Here, it is supposed that a buyer selected "no category." In this case, the "list of goods" page as in FIG. 54 will be displayed. The other goods lists will be described later. If a buyer presses the cancel button, the home site of the virtual shopping mall as in FIG. 20 will be displayed.

Figures 54, 55:
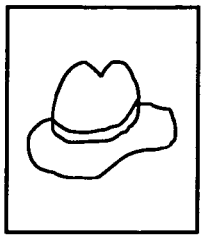
FIG. 54 is the screen page for selecting an item for more details, which is displayed on the screen of the terminal base unit.
FIG. 55 is the screen page for showing detailed information of the selected item, which is displayed on the screen of the terminal base unit.

FIG. 54 is the screen page for selecting an item for more details. A buyer designates an image of an item for more detailed information. Other lists of items are displayed according to the operation of the back button and the next button. If a buyer designates an image of an item, the "detailed information" page as in FIG. 55 will be displayed. If a buyer presses the cancel button, the "goods search" page as in FIG. 52 will be displayed.

FIG. 55 is the screen page for showing the selected item information in detail. A buyer looks at the detailed information and decides whether or not to purchase the item. If a buyer selects the item, the "purchase of goods" page as in FIG. 56 will be displayed. If a buyer presses the back button, the "list of goods" page as in FIG. 54 will be displayed.

FIG. 56 is the first screen page for purchasing the selected item. A buyer inputs his/her e-mail address and telephone number.

FIG. 57 is the second screen page for purchasing the selected item. This screen page shows the completed state of the e-mail address and telephone number. A buyer designates a receiving shop for receiving the purchased item. If a buyer selects the shop where the buyer is operating the terminal base unit, the buyer selects the "receive at this shop" button. If a buyer selects the "receive at this shop" button, the "confirmation of purchase" page as in FIG. 59 will be displayed. If a buyer selects the "receive at another shop" button, the "shop selection" page as in FIG. 58 will be displayed.

Figures 58, 59:
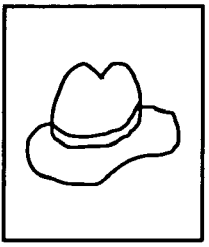
FIG. 58 is the screen page for selecting a shop to receive the purchased item, which is displayed on the screen of the terminal base unit.
FIG. 59 is the screen page for confirming the purchased item, which is displayed on the screen of the terminal base unit.

FIG. 58 is the screen page for selecting a shop to receive the purchased item. A buyer selects a shop to receive the purchased item. It a buyer selects a shop, the "confirmation of purchase" page as in FIG. 59 will be displayed. If a buyer presses the back button, the "purchase of goods" page as in FIG. 56 will be displayed.

FIG. 59 is the screen page for confirming the purchased item. A buyer confirms the item and presses the OK button. If a buyer presses the OK button, the "your purchase has been completed" page as in FIG. 60 will be displayed. If a buyer presses the cancel button, the "detailed information" page as in FIG. 55 will he displayed.

Figure 60:
FIG. 60 is the screen page for notifying the end of purchase process, which is displayed on the screen of the terminal base unit.

FIG. 60 is the screen page for notifying the end of purchase proceedings. The terminal base unit issues a trade ID to a buyer. The purchase proceedings are then completed. If a buyer presses the OK button, the "goods search" page as in FIG. 52 will be displayed.

Figure 61:
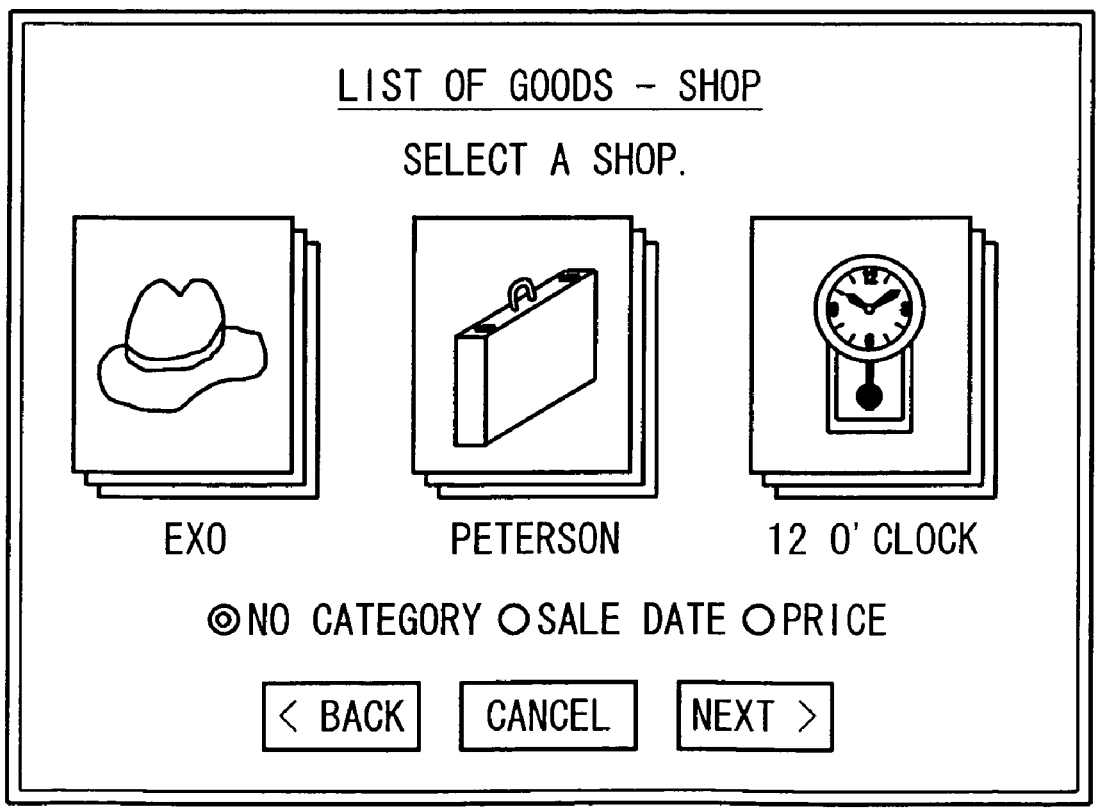
FIG. 61 is the screen page for selecting an item by the shop, which is displayed on the screen of the terminal base unit.
Figure 62:
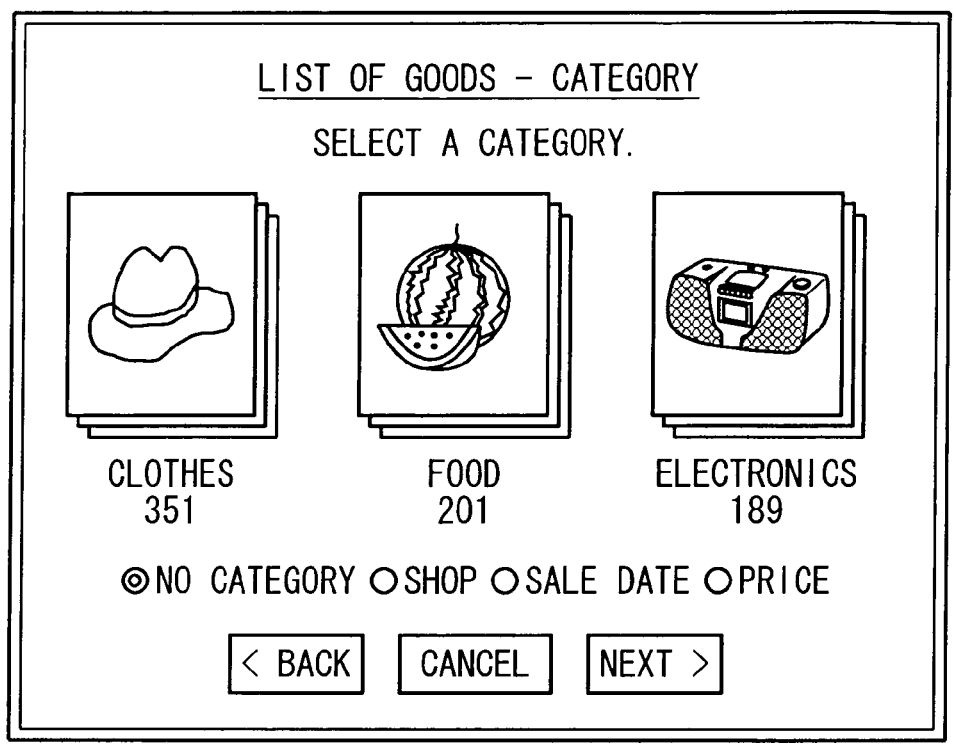
FIG. 62 is the screen page for selecting an item by the category, which is displayed on the screen of the terminal base unit.
Figure 63:
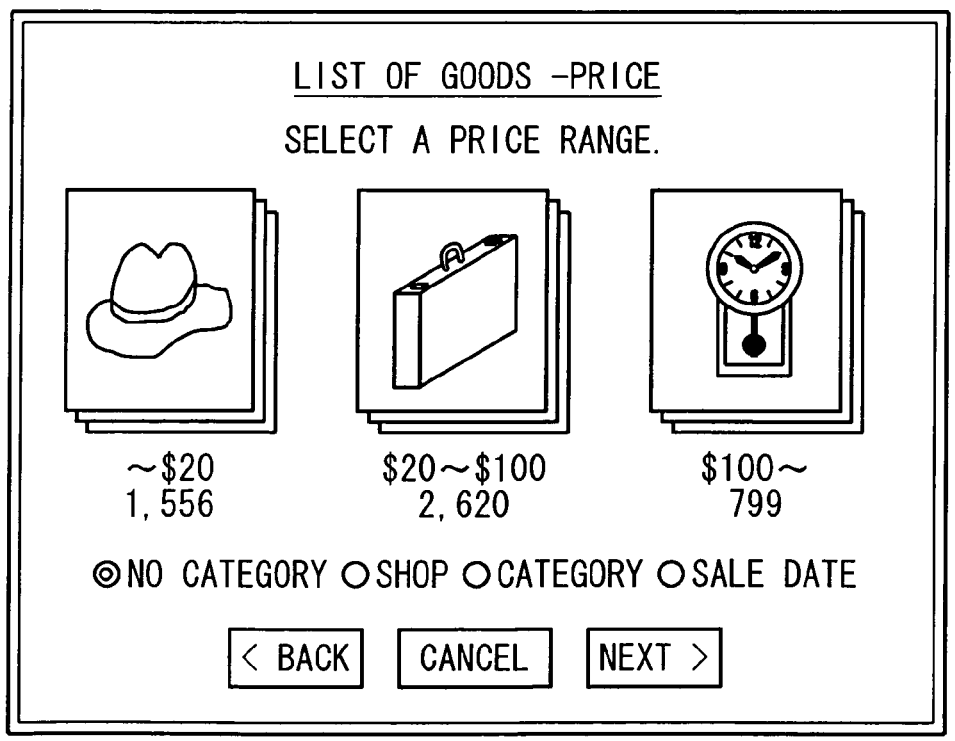
FIG. 63 is the screen page for selecting an item by the price range, which is displayed on the screen of the terminal base unit.

FIG. 61 to FIG. 63 are examples of other displays for goods lists.

FIG. 61 is the screen page for selecting an item by the shop. This page is shown when a buyer selects the "shop" category in the "goods search" page in FIG. 52. The list of goods is categorized in each shop. One of the images of the registered goods Is displayed as a representative image for each shop. If a buyer selects an image, the item corresponding to the searched conditions will be displayed by selecting from the groups of goods registered in the corresponding shop.

A buyer can further select the rest of the categories of "no category," "sale date," and "price" in the screen page of FIG. 61. If a buyer selects other than "no category," a screen page listing goods that categorized the items of the corresponding shop by designated item, will be displayed. These further processes of categorizing will be conducted in the same way as to the other category items in the following.

FIG. 62 is the screen page for selecting an item by category. This page is shown when a buyer selects the "category" for the category in the "goods search" page in FIG. 52. The list of goods categorized in each category will be displayed. If a buyer selects an image, the item corresponding to the searched conditions will be displayed by selecting from the groups of goods registered in the corresponding shop.

FIG. 63 is the screen page for selecting an item by the price range. This page is shown when a buyer selects the "price" for the category in the "goods search" page in FIG. 52. The list of goods categorized in each price range will be displayed. If a buyer selects an image, the item corresponding to the searched conditions will be displayed by selecting from the groups of goods registered in the corresponding shop. Although the figure about the category "sale date" is not shown, it will be basically the same as the other category.

Each function of a terminal base unit of a chain store has been described above based on screen pages using Graphical User Interface, or GUI, relating to each function, though it is only one aspect of a terminal base unit.

Common functions between terminals of sellers and buyers are included in the functions of a terminal base unit described above. Those common functions include goods registration, searching goods, and ordering goods. These functions can be achieved by a terminal of both a seller and a buyer, by gaining access to a virtual shop. Even if the terminal is different, since the functional aspect is the same for both sellers and buyers, the description is omitted.

"Image database engine"

In order to achieve these plentiful functions on a terminal, it is preferable that a server as a virtual shopping mall operations apparatus has a high-quality image database engine. An image database engine of communication type that takes advantage of the Web environment may be preferably applicable.

The image database engine preferably includes such functions as registering, searching, deleting, and editing images. Such database engine, as a user can easily use these functions through the Internet by using a web browser, is preferable. For example, a seller can easily register, delete, and edit images of goods. A buyer can easily search images of goods.

It is preferable that an image database engine includes a grouping function, which makes it possible to change the category of an image dynamically. This function makes it possible for a terminal to display a list of goods images by each category as shown in FIGS. 53, 62, and 63. In FIG. 53, shop, category, sale date, and price range are shown as examples of categories. Groups of goods can be recomposed dynamically by the grouping function. It is preferable that the grouping function can categorize images according to the tree structure, or hierarchical structure, based on a plurality of categorizing items.

The database engine may further include functions such as limiting access, customizing databases, and customizing displays. Moreover, a library program, which adapts to the database engine described above, is preferably used for the development of applications for a virtual shopping mall operations apparatus.

<Option>

Other various optional functions will be described in the following.

"Cooling-off policy"

It a buyer requests a cooling-off, the purchased item will be returned from the buyer to the seller. A virtual shopping mall operations apparatus promotes the return in the same way as the delivering of goods, although the process will be the opposite. In order to proceed a cooling-off, expenses, such as shipment, will arise. Therefore, predetermined charges may be set based on the predictable incidence of cooling-off. That is, charges are added to cover costs such as shipment.

"Measures for tricks made by buyers"

A buyer may intentionally order goods to a virtual shop without a will to purchase. In this case, the buyer may not come to a shop to receive the purchased goods, Thus, the system may operate in a way that a seller gets paid after a buyer makes a payment.

"Blacklist of buyers"

A virtual shopping mall operations apparatus puts the e-mail address, of whom did not arrive to receive the goods despite that he/she made an order, into a black list. The virtual shopping mall operations apparatus then manages this black list. If those who are in the black list make another order, the order becomes invalid. For example, if the virtual shopping mall operations apparatus receives an order from the same e-mail address for the second time, the order will be ignored.

"Blacklist of sellers"

When a seller registers goods, an inspection process will be undertaken. If the goods that a seller tried to register to a virtual shop had been denied, the seller will be put in a black list. The virtual shopping mall operations apparatus manages this black list. Certain penalty processes are conducted against the seller, according to the number of times the seller was black listed.

"Cancellation of rights to sell goods"

When a seller wants to cancel the contract of the right to sell goods on a virtual shop, the seller goes to the nearest chain store. A terminal base unit installed at a chain store has the function of cancel processing.

"Discount fee"

The fee for a virtual shop is see lower for sellers who makes many deals. This discount may be arranged by unit of goods. For example, the rental fee of the shelves is set free for goods that sell well. The sale status is judged by whether or not the number of trades during a certain period of time is below the predetermined level. The basis amount may he arranged differently according to the price of the goods. This discount system may promote sellers to positively improve their shops.

"Function of displaying rankings"

This is a function to display on each terminal a ranking list of the number of trades made. A virtual shopping mall operations apparatus makes the ranking list and sends the list to each terminal. Preferably, ranking lists of a plurality of categories, such as goods, category, and shop, are displayed by switching over one another or an display. These rankings may be sent to terminals of sellers and buyers as well as terminals of a chain store.

For example, in a virtual shopping mall operations apparatus, a column for the sum number of sales is set in the owner managing database 22 and the commercial goods managing database 24 for the function of displaying these rankings. Every time a trade occurs, the value of the column increases. The result of the sum total is displayed on the home page of the service. Preferably, predetermined numbers (for example, 5) of goods, categories, and shops are displayed in order of the largest number of the sum total.

Buyers can obtain profitable information by this kind of display ranking. Sellers can get a good stimulus for improving their own shops. Revitalization of the virtual shopping mall system by these synergy effects can be expected.

"Customer appreciation system"

This system is a function that discounts the price of goods which makes many trades, according to the number of trades made.

FIG. 64 is an example of the discount setting table, which is used for this function. This table is prepared in a virtual shopping mall operations apparatus. Sale prices will be discounted according to the number of trades made, based on this table. A seller can select the type of discount when the seller registers goods. The result of this choice is stored in a virtual shopping mall operations apparatus, or a goods database. The price calculated based on the table will be presented to buyers, according to the result of the choice. A seller can also select whether or not to discount.

Buyers can get an advantage because they can purchase best-seller goods with lower prices, using the discount system described above. On the other hand, sellers can expect a further increase in sold goods whose number of shipments has hit the ceiling. Operators of virtual shops can expect an increase in attracting more customers and the accompanying increase in fee income.

"System of returning points to buyers"

Points are accumulated according to the amount a buyer has purchased Buyers can purchase goods by using the points for the next time. These points may be used for purchasing other goods that sell at chain stores, that is, for purchasing goods other than at the virtual shopping mall.

Buyers can purchase goods anonymously in this virtual shopping mall service, but buyers have to input their e-mail addresses and telephone numbers when buyers make purchases. A customer managing database is built by using these e-mail addresses and phone numbers as key pieces of information. A certain ratio, five percent, for example, of the traded amount is accumulated to the points for every trade. The accumulated points will be written in a point card of a chain store, by inputting an e-mail address and a phone number on a terminal base unit at a shop. A buyer can then use the points. The point card may be used at a counter of a chain store other than on a terminal base unit at a shop.

<Advantages>

The preferred embodiments according to the present invention have been described above. Various advantages of the present embodiment will be described in the following.

(1) According to the present embodiment, a method and system for operating a virtual shopping mall of seller-engaged type are provided. A seller participates in the virtual shopping mall system by using communications rather than managing a virtual shop by himself/herself.

According to the present embodiment, if a seller sends virtual goods information to a virtual shopping mall operations apparatus, the virtual shopping mall operations apparatus manages the seller's virtual shop and its goods. Since a trade between a seller and a buyer is intermediated by the virtual shopping mall operations apparatus, direct contact is not necessary. A seller does not need to present his/her name to buyers. The credibility of the trades are assured by the virtual shopping mall operations apparatus.

In this way, according to the present embodiment, the burden on sellers can be lightened compared to the conventional Internet mail-order system. An individual can easily be a seller of a virtual shopping mall system by the present embodiment.

According to the conventional Internet mail-order system, a provider only provides a space for a homepage and plays a role of only introducing sellers and buyers. Sellers require a great deal of work including using computer language to make a homepage. According to the present embodiment, the burden on sellers can be reduced.

(2) Moreover, according to the present embodiment, groups of chained terminal bases and a physical distribution system are well used as described in the following. A terminal base is basically a chain store.

First, the anonymity of sellers can be secured. If a seller sends goods directly to a buyer like the conventional Internet mail-order system, the name of the seller will be exposed. According to the present embodiment, since the delivery is conducted through a physical distribution system, the name of a seller will not be exposed in the delivery of goods. The anonymity of buyers is also secured.

A terminal base functions as a terminal post of the physical distribution system at the time of delivering goods. A seller brings goods to a terminal post. A buyer receives the goods at another terminal post. By taking advantage of the physical distribution system, the delivery of goods is conducted safely and promptly without fault.

As is already known, chain stores such a convenience store functions as a terminal of a parcel delivery service, or a door-to-door delivery service. However, the delivery system according to the present embodiment differs fundamentally from the delivery system of a parcel delivery service. First of all, anonymity cannot be secured since a seller must write his/her name and the destination. Further, the function of delivery path setting and managing, for the delivery of goods by virtual shops according to the present embodiment, cannot be found in a parcel delivery service.

(3) Further, according to the present embodiment, a great number of advantages are also provided to a chain store as a terminal base.

According to the present embodiment, buyers visit a chain store and receive goods. Sellers also bring in goods to a chain store. Buyers and sellers are both customers and consumers for a chain store. With only one trade in a virtual shopping mall, two consumers visit chain stores. Therefore, chain stores can attract more consumers.

Furthermore, the existing physical distribution system that chain stores form is used effectively. In other words, goods for virtual shops are delivered by taking advantage of the reserve capacity of a physical distribution system for real shops. Delivery charge scan also be gained by this system.

Neither chain store has to expand its floor space nor manage goods. Since the registration of goods is conducted by sellers, the burden on chain stores is less. From the buyers point of view, chain stores look like as though they have shelves of virtual goods in their shops. All of the chain stores can get the same effect as they sell many more goods. The chain stores can practically increase the amount of goods with which they deal without having stock.

(4) Further advantages for sellers will be described in the following.

A seller visits a terminal base and registers as an owner. The time and physical cost to obtain a right to sell goods is low. For example, if a terminal base is a convenience store, it will take only the same number of labor hours as going shopping for small articles as to open a virtual shop. Sellers do not need to invest large amount of labor to make a homepage by themselves.

Sellers can exhibit virtual goods information, that is, goods catalog, broadly with less management cost. The practical labor to register goods will be only to take photographs of goods by digital camera and to upload the photographed image data.

Sellers do not need to keep track of the stock all the time. Sellers can check the stock and respond to buyers only when an order is made. Sellers can have both a virtual shop and a real shop. Sellers can also have a plurality of virtual shops.

Moreover, according to the present embodiment, the "shelves for goods," that is, the space for virtual shops, are set differently according to the fee charged to sellers. A seller can have a virtual shop with a reasonable price, according to his/her own financial muscle. This system can be advantageous to the operator of the virtual shopping mall system. The operator does not need to provide unnecessarily large spaces to sellers and, therefore, can avoid wasting the capacity of a memory.

Further, according to the present embodiment, the costs to maintain a virtual shop are set lower for sellers whose amount of trade is large. Each seller then tries to improve his/her virtual shop and goods.

Furthermore, according to the present embodiment, goods are inspected when sellers register goods. Then, penalties are imposed on sellers if needed. By these penalties, exhibiting inappropriate goods information can be avoided. Thus, it becomes possible to form and maintain a virtual shopping mall just as the operator of the virtual shopping mall designs.

Moreover, according to the present embodiment, a black list, which shows buyers who do not receive real goods despite having made a deal on a virtual shop, is formed. This black list makes it possible to keep the trade safe.

(5) According to the present embodiment, terminal base units installed at terminal bases can also be independent and characteristic structures. A terminal base unit may be installed at a chain store, for example. Terminal base units are useful in functioning the virtual shopping mall system smoothly by their preferable functions. The virtual shopping mall system becomes more convenient by these preferable functions.

Therefore, registration of sellers as owners becomes easy by installing terminal base units. The delivery of goods can be conducted smoothly. Appropriate services for registering goods can be provided to sellers. In particular, the function of making image pictures of goods is convenient to sellers. The function of printing catalogs is also convenient.

For buyers, it is convenient to be able to search goods. Buyers can gain access to virtual shops by using cellular phones. However, functions of cellular phones are limited, for example the size of the display. On the other hand, if buyers use terminal base units, buyers can make use of virtual shops even when buyers are outside.

The present embodiment can be comprehended as a goods distribution method or a goods distribution system. A virtual shopping mall system, which is opened by using a computer system, and a physical distribution system, which is formed at a plurality of real chained terminal bases, are accreted in the goods distribution system. The virtual shopping mall system can provide functions of goods catalog and order management.

Also, the present embodiment can be comprehended as a chain store system. The chain store system includes a plurality of chain stores and physical distribution system that connects the plurality of chain stores. The chain store system is accreted with the virtual shopping mall system using a computer system.

Further, another embodiment may be a recording medium, which achieves the method for operating a virtual shopping mall described above. This program is executed by the server of the virtual shopping mall operations apparatus.

Although the present invention has been described by way of exemplary embodiments, it should be understood that many changes and substitutions may be made by those skilled in the art without departing from the spirit and the scope of the present invention which is defined only by the appended claims.

For example, various structures that are described in the figures do not have to physically be one unit. The virtual shopping mall operations apparatus may be a system structured by a plurality of computers. Also, for example, although sellers and buyers are connected to virtual shops by the Internet according to the present embodiment, sellers and buyers may be connected to virtual shops by other optional means of communication.

According to the present invention, a method and system for operating a virtual shopping mall of seller-engaged type are provided. It is preferable that a physical distribution system formed by chained terminal bases be used for delivering goods of virtual shops. Virtual shopping then becomes convenient.

What is claimed is:

1. A method for operating a virtual shopping mall by using a computer system, the computer system being established on a plurality of chain stores which are chained in advance to one another to form a physical distribution system, each of said chain stores including a terminal base unit for registering virtual goods information including an image, said terminal base units being connectable to the virtual shopping mall by a communication line, said method comprising:

registering virtual goods information, which corresponds to a seller's real goods, from one of said terminal base units provided in one of said chain stores to the virtual shopping mall after receiving said virtual goods information from said seller, said registering virtual goods information including the image of said real goods as a part of said virtual goods information;

intermediating business between said seller and a buyer on said virtual shopping mall by presenting said virtual goods information to the buyer;

setting a delivery path on the physical distribution system for delivering said real goods from said seller to said buyer in accordance with said buyer's selection of a terminal base from which said buyer receives said real goods;

establishing trading between said buyer and said seller, which achieves business on said virtual shopping mall; and setting a maximum value of a number of categories of virtual goods, which can be displayed on said virtual shopping mall, according to a fee charged to said seller.

2. A shop terminal base unit for registering commercial goods in a virtual shopping mall which is operated by a virtual shopping mall operation apparatus for intermediating business on an Internet, the shop terminal base unit being provided at one of a plurality of real stores which are chained to one another and form a physical distribution system, comprising:

a display device including a touch panel type display screen, which displays a predetermined screen page;

a digital camera which obtains an image data of the goods to be registered in the virtual shopping mall;

an accommodating part for accommodating the digital camera therein;

an input unit including a touch pen used for the touch panel type display screen, the input unit inputting goods information by a seller in accordance with the predetermined screen page displayed in the display device;

a virtual goods information generating unit which generates virtual goods information based on the image data of the goods captured by the digital camera;

a commercial goods registration processing unit which registers the virtual goods information generated by said virtual goods information generating unit in the virtual shopping mall operation apparatus;

a commercial goods purchase processing unit which transmits, into the virtual shopping mall operation apparatus, information of a real shop where the goods are to be delivered, the information of the real shop being selected from the plurality of real stores by a buyer in accordance with a predetermined screen page displayed in said display device and being inputted from the input unit; and a fee processing unit including a slot for inserting and returning coins and bills for paying an owner registration fee, the fee processing unit demanding the owner registration fee for the seller upon receipt of a notification from the shopping mall operation apparatus that the information from the seller has been registered in the virtual shopping mall operation apparatus.

3. The shop terminal base unit as claimed in claim 2, wherein said capturing device further includes a scanner.

4. The shop terminal base unit as claimed in claim 2, further comprising a media drive for reading out the goods information from a recording medium in which the goods information is stored in advance.

5. The shop terminal base unit as claimed in claim 2, further comprising an owner registration processing unit which registers information of the seller in the virtual shopping mall operation apparatus, said information of the seller being inputted by the seller via said input unit in accordance with a predetermined screen page displayed in said display device.

6. The shop terminal base unit as claimed in claim 5, wherein said information of the seller includes at least one of a telephone number, an address and an &mail address of the seller.

7. The shop terminal base unit as claimed in claim 2, further comprising a commercial goods searching unit which communicates with the virtual shopping mall operation apparatus and obtains virtual goods information in relation to at least one of a keyword and a price which are inputted by the input device in accordance with a predetermined screen page displayed in said display device.

8. The shop terminal base unit as claimed in claim 2, wherein said commercial goods purchase processing unit registers information of the buyer in the virtual shopping mall operation apparatus and notifies the seller of an order for the goods by the buyer via the virtual shopping mall operation apparatus.

9. The shop terminal base unit as claimed in claim 8, wherein the information of the buyer includes at least one of a telephone number and an e-mail address of the buyer.

10. The shop terminal base unit as claimed in claim 2, further comprising a real goods receiving managing unit which obtains from the virtual shopping mall operation apparatus the information of the real shop where the goods are to be delivered when a trade ID is inputted via said input unit, the trade ID being issued by the virtual shopping mall operation apparatus when a trade between the seller and the buyer is reached.

11. The shop terminal base unit as claimed in claim 10, wherein said real goods receiving managing unit notifies the buyer about an arrival of the goods via the virtual shopping mall operation apparatus when the goods have been delivered to the real shop.

12. The shop terminal base unit as claimed in claim 11, wherein the information about the arrival of the goods includes a trade ID which is related to the information of the buyer.

13. The shop terminal base unit as claimed in claim 2, further comprising:
   a printer; and
   a catalog printing unit which prints out catalogs of the virtual goods information via said printer.

14. The shop terminal base unit as claimed in claim 2, further comprising an original shop site creating unit for creating an original site on the shopping mall.

15. The shop terminal base unit as claimed in claim 2, further comprising a fee processing unit which demands a fee for the goods from a buyer when a trade ID of the buyer is inputted via the input unit and which pays the fee for the goods to the seller when a trade ID of the seller is inputted via the input unit, wherein both the trade ID of the buyer and the trade ID of the seller are issued by the virtual shopping mall operation apparatus if a trade between the seller and the buyer is reached.

16. The shop terminal base unit as claimed in claim 15, wherein said fee processing unit includes a slot for inserting and returning coins and bills for paying an owner registration fee.

17. The shop terminal base unit as claimed in claim 2, wherein the goods information inputted by the seller is devoid of a name of the seller and the information of the real shop inputted by the seller is devoid of a name of the buyer.

* * * * *

UNITED STATES PATENT AND TRADEMARK OFFICE
CERTIFICATE OF CORRECTION

PATENT NO. : 7,266,511 B2
APPLICATION NO. : 09/742362
DATED : September 4, 2007
INVENTOR(S) : Atsushi Teshima It is certified that error appears in the above-identified patent and that said Letters Patent is hereby corrected as shown below:

TITLE PAGE, ITEM (54) SHOULD READ AS FOLLOWS:
(54) METHOD AND SYSTEM FOR OPERATING A VIRTUAL SHOPPING MALL OF SELLER-ENGAGED TYPE

Signed and Sealed this

Twenty-fifth Day of December, 2007

JON W. DUDAS
*Director of the United States Patent and Trademark Office*